(12) United States Patent
Aronson et al.

(10) Patent No.: US 9,229,239 B2
(45) Date of Patent: Jan. 5, 2016

(54) LIGHT REDIRECTING FILM AND DISPLAY SYSTEM INCORPORATING SAME

(71) Applicant: 3M INNOVATIVE PROPERTIES COMPANY, St. Paul, MN (US)

(72) Inventors: Joseph T. Aronson, Menomonie, WI (US); Slah Jendoubi, Fridley, MN (US); Mitchell A. F. Johnson, Maplewood, MN (US); Scott R. Kaytor, Woodbury, MN (US); Tri D. Pham, Woodbury, MN (US); Robert A. Yapel, Oakdale, MN (US); Joseph A. Zigal, Lago Vista, TX (US); Steven J. McMan, Stillwater, MN (US); Steven D. Solomonson, Shoreview, MN (US); Steven Hin-Chung Kong, Woodbury, MN (US); Fei Lu, Woodbury, MN (US); Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/186,363

(22) Filed: Feb. 21, 2014

(65) Prior Publication Data

US 2014/0313587 A1 Oct. 23, 2014

Related U.S. Application Data

(63) Continuation of application No. 13/375,271, filed as application No. PCT/US2010/036018 on May 25, 2010, now Pat. No. 8,657,472.

(60) Provisional application No. 61/183,154, filed on Jun. 2, 2009.

(51) Int. Cl.
*G02B 27/12* (2006.01)
*G02B 5/02* (2006.01)
(Continued)

(52) U.S. Cl.
CPC ............... *G02B 27/126* (2013.01); *G02B 5/02* (2013.01); *G02B 5/045* (2013.01); *G02B 6/0053* (2013.01); *B32B 2307/40* (2013.01); *G02F 2001/133607* (2013.01)

(58) Field of Classification Search
CPC ........ G02B 5/02; G02B 27/126; G02B 5/045; G02B 6/0053; B32B 2307/40; G02F 2001/133607; G02F 1/133502; G02F 2202/36
USPC ........... 362/97.1, 326, 330, 333, 336, 311.01, 362/558; 359/559, 536
See application file for complete search history.

(56) References Cited

U.S. PATENT DOCUMENTS 5,433,973 A 7/1995 Wallack
5,844,720 A 12/1998 Ohara
(Continued)

FOREIGN PATENT DOCUMENTS

EP 1720044 11/2006
EP 1793263 6/2007
(Continued)

OTHER PUBLICATIONS

ASTM Designation: D1003-00, "Standard Test Methods for Haze and Luminous Transmittance of Transparent Plastics", 2000, pp. 1-6.
(Continued)

*Primary Examiner* — Thomas A Hollweg
(74) *Attorney, Agent, or Firm* — Clifton F. Richardson

(57) ABSTRACT

Light redirecting film is disclosed. The light redirecting film includes a first major surface that includes a plurality of first microstructures that extend along a first direction. The light redirecting film also includes a second major surface that is opposite to the first major surface and includes a plurality of second microstructures. The second major surface has an optical haze that is not greater than about 3% and an optical clarity that is not greater than about 85%. The light redirecting film has an average effective transmission that is not less than about 1.75.

4 Claims, 21 Drawing Sheets

(51) Int. Cl.
*G02B 5/04* (2006.01)
*F21V 8/00* (2006.01)
*G02F 1/1335* (2006.01)

(56) References Cited

U.S. PATENT DOCUMENTS

| | | |
|---|---|---|
| 5,995,288 A | 11/1999 | Kashima |
| 6,693,746 B1 | 2/2004 | Nakamura |
| 6,709,143 B2 | 3/2004 | Harada |
| 6,719,426 B2 | 4/2004 | Magarill |
| 6,778,240 B2 | 8/2004 | Nakamura et al. |
| 6,788,359 B2 | 9/2004 | Lee |
| 6,825,984 B2 | 11/2004 | Kashima |
| 7,006,293 B2 | 2/2006 | Kuo |
| 7,074,463 B2 | 7/2006 | Jones |
| 7,287,894 B2 | 10/2007 | Chen |
| 7,328,628 B2 | 2/2008 | Laugharn |
| 7,328,638 B2 | 2/2008 | Gardiner |
| 7,350,442 B2 | 4/2008 | Ehnes |
| 7,618,164 B2 | 11/2009 | Wang |
| 7,843,637 B2 | 11/2010 | Biernath |
| 8,081,385 B2 | 12/2011 | Matsumura |
| 8,125,590 B2 | 2/2012 | Kim |
| 8,325,418 B2 | 12/2012 | Nagahama |
| 2005/0064142 A1 | 3/2005 | Matsunaga |
| 2005/0200278 A1 | 9/2005 | Jones |
| 2006/0210726 A1 | 9/2006 | Jones |
| 2006/0215079 A1 | 9/2006 | Suzuki |
| 2006/0257679 A1 | 11/2006 | Benson |
| 2007/0010594 A1* | 1/2007 | Wang et al. .......... 522/182 |
| 2007/0104896 A1 | 5/2007 | Matsunaga |
| 2007/0115407 A1 | 5/2007 | Richard |
| 2007/0121211 A1 | 5/2007 | Watanabe |
| 2007/0247568 A1 | 10/2007 | Suga |
| 2007/0286994 A1 | 12/2007 | Walker |
| 2008/0014341 A1 | 1/2008 | Richter |
| 2008/0032096 A1 | 2/2008 | Bourdelais |
| 2008/0064133 A1 | 3/2008 | Lee |
| 2008/0151372 A1 | 6/2008 | Ouderkirk |
| 2008/0212005 A1 | 9/2008 | Miyauchi |
| 2008/0221291 A1 | 9/2008 | Invie |
| 2009/0029054 A1 | 1/2009 | Yapel |
| 2009/0080082 A1 | 3/2009 | Matsunaga |
| 2009/0086326 A1 | 4/2009 | Hamamoto |
| 2009/0115943 A1 | 5/2009 | Gaides |
| 2009/0233048 A1 | 9/2009 | Murata |
| 2009/0316269 A1 | 12/2009 | Kim |
| 2010/0238686 A1 | 9/2010 | Weber |
| 2010/0246011 A1 | 9/2010 | Ohishi |
| 2010/0302479 A1 | 12/2010 | Aronson |
| 2011/0222263 A1 | 9/2011 | Weber |
| 2011/0222295 A1 | 9/2011 | Weber |
| 2011/0228511 A1 | 9/2011 | Weber |
| 2011/0279997 A1 | 11/2011 | Weber |
| 2012/0064296 A1 | 3/2012 | Walker, Jr. |

FOREIGN PATENT DOCUMENTS

| | | |
|---|---|---|
| EP | 1962111 | 8/2008 |
| EP | 1972988 | 9/2008 |
| EP | 1990662 | 11/2008 |
| JP | 06-265888 | 9/1994 |
| JP | 2002-365410 | 12/2002 |
| JP | 2004-348156 | 12/2004 |
| JP | 2005-092197 | 2/2008 |
| JP | 2008-268834 | 11/2008 |
| JP | 2009-086410 | 4/2009 |
| KR | 20100006748 | 1/2010 |
| KR | 20100056183 | 5/2010 |
| WO | WO 01-22129 | 3/2001 |
| WO | WO 00-48037 | 4/2005 |
| WO | WO 2008-042457 | 4/2008 |
| WO | WO 2008-020610 | 6/2008 |
| WO | WO 2008-069320 | 6/2008 |
| WO | WO 2008-075876 | 11/2008 |
| WO | WO 2008-144136 | 11/2008 |
| WO | WO 2010-141261 | 12/2010 |
| WO | WO 2011-140018 | 11/2011 |
| WO | WO 2011-028373 | 12/2011 |
| WO | WO 2011-149715 | 12/2011 |

OTHER PUBLICATIONS

Billmeyer, Jr., "On the Measurement of Haze", Color Research and application, Dec. 1985, vol. 10, No. 4, pp. 219-224.
Webber, "Method for the Measurement of Transparency of Sheet Materials", Journal of the Optical Society of America, Sep. 1957, vol. 47, No. 9, pp. 785-789.
International Search Report for PCT/US2010/036018, mailed Feb. 3, 2011, 6 pgs.
International Search Report for PCT/US2010/045118, mailed Dec. 15, 2010, 4 pgs.
International Search Report for PCT/US2011/036825, mailed Jul. 22, 2011, 4 pages.
Written Opinion for PCT/US2010/036018, mailed Feb. 3, 2011, 14 pages.

\* cited by examiner

LIGHT REDIRECTING FILM AND DISPLAY SYSTEM INCORPORATING SAME

CROSS REFERENCE TO RELATED APPLICATIONS

This application is a continuation of U.S. National Stage application Ser. No. 13/375,271, filed on Jan. 24, 2012, which is a U.S. National Stage filing under 35 U.S.C. 371 of PCT/US2010/036018, filed on May 25, 2010, which claim priority to U.S. Provisional Application No. 61/183,154, filed on Jun. 2, 2009, the disclosure of which are incorporated by reference in their entirety herein.

FIELD OF THE INVENTION

This invention generally relates to optical films for redirecting light. The invention is further applicable to optical systems, such as display systems, incorporating such optical films.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps and a number of light management films such as, for example, lightguides, mirror films, light redirecting films, retarder films, light polarizing films, and diffuser films. Diffuser films are typically included to hide optical defects and improve the brightness uniformity of the light emitted by the backlight.

SUMMARY OF THE INVENTION

Generally, the present invention relates to light redirecting films. In one embodiment, a light redirecting film includes a first major surface that includes a plurality of first microstructures that extend along a first direction. The light redirecting film also includes a second major surface that is opposite to the first major surface and includes a plurality of second microstructures. The second major surface has an optical haze that is not greater than about 3% and an optical clarity that is not greater than about 85%. The light redirecting film has an average effective transmission that is not less than about 1.75. In some cases, the plurality of first microstructures include a plurality of linear prisms that extend along the first direction. In some cases, the maximum height of a microstructure in the plurality of first microstructures is different than the maximum height of another microstructure in the plurality of first microstructures. In some cases, the height of a microstructure in the plurality of first microstructures varies along the first direction. The plurality of second microstructures can include protrusions and/or recessions. In some cases, the plurality of second microstructures covers at least about 80%, or at least about 85%, or at least about 90%, or at least about 95%, of the second major surface. The plurality of second microstructures can form regular or irregular patterns. In some cases, no more than about 7%, or no more than about 5%, or no more than about 3%, of the second major surface has a slope magnitude that is greater than about 3.5 degrees. In some cases, no more than about 4%, or no more than about 2%, or no more than about 1%, of the second major surface has a slope magnitude that is greater than about 5 degrees. In some cases, the second microstructures are not formed primarily by any particles that the light redirecting film may include. In some cases, the light redirecting film does not include particles that have an average size greater than about 0.5 microns. In some cases, the microstructures in the plurality of second microstructures have a slope distribution that has a half width half maximum (HWHM) that is not greater than about 6 degrees. In some cases, the light redirecting film includes a substrate layer that has opposing first and second major surfaces, a first layer that is disposed on the first major surface of the substrate layer and includes the first major surface of the light redirecting film, and a matte layer that is disposed on the second major surface of the substrate layer and includes the second major surface of the light redirecting layer. In some cases, the first layer has an index of refraction that is not less than about 1.6. In some cases, the matte layer includes a plurality of particles that have an average size that is less than the average size of the plurality of second microstructures by at least a factor of 5. In some cases, if the matte layer includes particles, then the average thickness of the matte layer is at least 2 microns greater than the average size of the particles. In some cases, if the matte layer includes particles, then the average thickness of the matte layer is greater than the average size of the particles by at least a factor of 2.

In another embodiment, a light redirecting film includes a first major surface that includes a plurality of linear microstructures, and a second major surface that is opposite to the first major surface and includes a plurality of second microstructures. The second major surface has an optical haze that is not greater than about 3% and an optical clarity that is not greater than about 85%. The average effective transmission of the light redirecting film is not less, or is less by no more, than about 1.5% as compared to a light redirecting film that has the same construction except for comprising a smooth second major surface. In some cases, the plurality of second microstructures has geometrical symmetry and asymmetric slope distribution. In some cases, the plurality of second microstructures includes geometrical asymmetry and symmetric slope distribution.

In another embodiment, an optical stack includes a first light redirecting film that includes a first major surface and an opposing second major surface, where the first major surface includes a first plurality of microstructures that extend along a first direction, and the second major surface includes a second plurality of microstructures. The optical stack also includes a second light redirecting film that includes a third major surface and an opposing fourth major surface, where the third major surface faces the second major surface of the first light redirecting film and includes a third plurality of microstructures that extend along a second direction that is different than the first direction, and the fourth major surface includes a fourth plurality of microstructures. Each of the second and fourth major surfaces has an optical haze that is not greater than about 3% and an optical clarity that is not greater than about 85%. In some cases, the optical stack has an average effective transmission that is not less than about 2.5.

In another embodiment, an optical stack includes a first light redirecting film that includes a first major surface and an opposing second major surface, where the first major surface includes a first plurality of microstructures that extend along a first direction. The optical stack also includes a second light redirecting film that includes a third major surface and an opposing fourth major surface, where the third major surface faces the second major surface of the first light redirecting film and includes a third plurality of microstructures that extend along a second direction that is different than the first direction. Each of the second and fourth major surfaces has an optical haze that is not greater than about 3% and an optical clarity that is not greater than about 85%. The average effective transmission of the optical stack is not less or is less by no more than about 1% as compared to an optical stack that has the same construction except for including smooth second and fourth major surfaces. In some cases, the optical stack has an average effective transmission that is not less as compared to an optical stack that has the same construction except for including smooth second and fourth major surfaces.

In another embodiment, an optical film includes a structured major surface that has geometrical symmetry and asymmetric slope distribution. In some cases, the optical film has an optical haze that is not greater than about 3% and an optical clarity that is not greater than about 85%.

In another embodiment, an optical film includes a structured major surface that has geometrical asymmetry and symmetric slope distribution. In some cases, the optical film has an optical haze that is not greater than about 3% and an optical clarity that is not greater than about 85%.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

This invention generally relates to light redirecting films that are capable of substantially enhancing brightness in a display system while at the same time masking and/or eliminating physical defects such as scratches, and undesirable optical effects such as moiré and color mora. The disclosed light redirecting films include an array of linear microstructures for improving brightness and a matte surface for improving the display cosmetics. The optical haze of the matte surface is sufficiently low to maintain brightness, and the optical clarity of the matte surface is sufficiently low to mask and/or eliminate defects.

Figure 1:
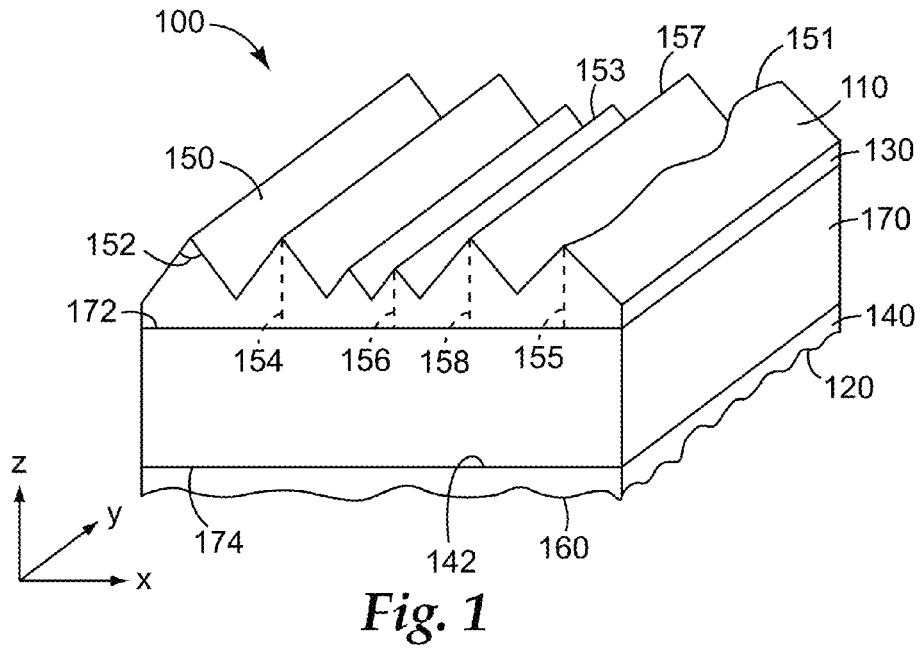
FIG. 1 is a schematic side-view of a light redirecting film.

FIG. 1 is a schematic side-view of a light redirecting film 100 for redirecting an incident light toward a desired direction. Light redirecting film 100 includes a first major surface 110 that includes a plurality of microstructures 150 that extend along the y-direction. Light redirecting film 100 also includes a second major surface 120 that is opposite first major surface 110 and includes a plurality of microstructures 160.

Light redirecting film 100 also includes a substrate layer 170 that is disposed between respective first and second major surfaces 110 and 120 and includes a first major surface 172 and an opposing second major surface 174. Light redirecting film 100 also includes a prism layer 130 that is disposed on first major surface 172 of the substrate layer and includes first major surface 110 of the light redirecting film, and a matte layer 140 that is disposed on second major surface 174 of the substrate layer and includes second major surface 120 of the light redirecting film. The matte layer has a major surface 142 opposite major surface 120.

The exemplary light redirecting film 100 includes three layers 130, 170 and 140. In general, the light redirecting film can have one or more layers. For example, in some cases, the light redirecting film can have a single layer that includes respective first and second major surfaces 110 and 120. As another example, in some cases, the light redirecting film can have many layers. For example, in such cases, substrate 170 can have multiple layers.

Microstructures 150 are primarily designed to redirect light that is incident on major surface 120 of the light redirecting film, along a desired direction, such as along the positive z-direction. In the exemplary light redirecting film 100, microstructures 150 are prismatic linear structures. In general, microstructures 150 can be any type microstructures that are capable of redirecting light by, for example, refracting a portion of an incident light and recycling a different portion of the incident light. For example, the cross-sectional profiles of microstructures 150 can be or include curved and/or piecewise linear portions. For example, in some cases, microstructures 150 can be linear cylindrical lenses extending along the y-direction.

Each linear prismatic microstructure 150 includes an apex angle 152 and a height 154 measured from a common reference plane such as, for example, major plane surface 172. In some cases, such as when it is desirable to reduce optical coupling or wet-out and/or improve durability of the light redirecting film, the height of a prismatic microstructure 150 can change along the y-direction. For example, the prism height of prismatic linear microstructure 151 varies along the y-direction. In such cases, prismatic microstructure 151 has a local height that varies along the y-direction, a maximum height 155, and an average height. In some cases, a prismatic linear microstructure, such as linear microstructure 153, has a constant height along the y-direction. In such cases, the microstructure has a constant local height that is equal to the maximum height and the average height.

In some cases, such as when it is desirable to reduce optical coupling or wet-out, some of the linear microstructures are shorter and some of the linear microstructures are taller. For example, height 156 of linear microstructure 153 is smaller than height 158 of linear microstructure 157.

Apex or dihedral angle 152 can have any value that may be desirable in an application. For example, in some cases, apex angle 152 can be in a range from about 70 degrees to about 110 degrees, or from about 80 degrees to about 100 degrees, or from about 85 degrees to about 95 degrees. In some cases, microstructures 150 have equal apex angles which can, for example, be in a range from about 88 or 89 degree to about 92 or 91 degrees, such as 90 degrees.

Prism layer 130 can have any index of refraction that may be desirable in an application. For example, in some cases, the index of refraction of the prism layer is in a range from about 1.4 to about 1.8, or from about 1.5 to about 1.8, or from about 1.5 to about 1.7. In some cases, the index of refraction of the prism layer is not less than about 1.5, or not less than about 1.55, or not less than about 1.6, or not less than about 1.65, or not less than about 1.7.

In some cases, such as when light redirecting film 100 is used in a liquid crystal display system, the light redirecting film 100 can increase or improve the brightness of the display. In such cases, the light redirecting film has an effective transmission or relative gain that is greater than 1. As used herein, effective transmission is the ratio of the luminance of the display system with the film in place in the display system to the luminance of the display without the film in place.

Figure 2:
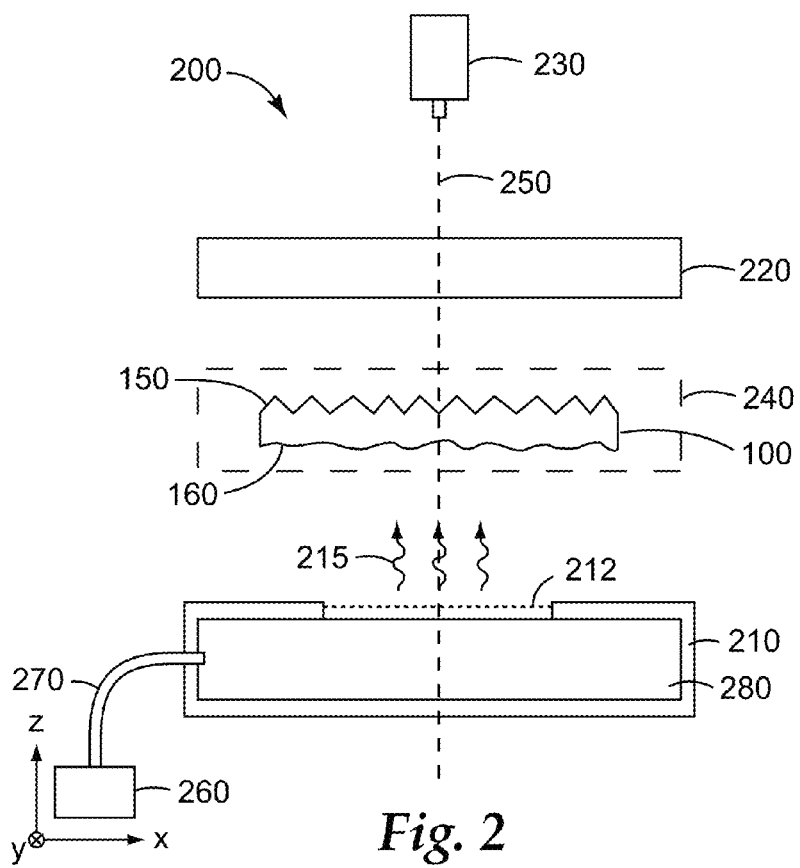
FIG. 2 is a schematic side-view of an optical system for measuring effective transmission.

Effective transmission (ET) can be measured using optical system 200, a schematic side-view of which is shown in FIG. 2. Optical system 200 is centered on an optical axis 250 and includes a hollow lambertian light box that emits a lambertian light 215 through an emitting or exit surface 212, a linear light absorbing polarizer 220, and a photo detector 230. Light box 210 is illuminated by a stabilized broadband light source 260 that is connected to an interior 280 of the light box via an optical fiber 270. A test sample the ET of which is to be measured by the optical system, is placed at location 240 between the light box and the absorbing linear polarizer.

The ET of light redirecting film 100 can be measured by placing the light redirecting film in location 240 with linear prisms 150 facing the photo detector and microstructures 160 facing the light box. Next, the spectrally weighted axial luminance $I_1$ (luminance along optical axis 250) is measured through the linear absorbing polarizer by the photo detector. Next, the light redirecting film is removed and the spectrally weighted luminance $I_2$ is measured without the light redirecting film placed at location 240. ET is the ratio $I_1/I_2$. ET0 is the effective transmission when linear prisms 150 extend along a direction that is parallel to the polarizing axis of linear absorbing polarizer 220, and ET90 is the effective transmission when linear prisms 150 extend along a direction that is perpendicular to the polarizing axis of the linear absorbing polarizer. The average effective transmission (ETA) is the average of ET0 and ET90.

Effective transmission values disclosed herein were measured using a SpectraScan™ PR-650 SpectraColorimeter (available from Photo Research, Inc, Chatsworth, Calif.) for photo detector 230. Light box 210 was a Teflon cube with a total reflectance of about 85%.

In some cases, such as when light redirecting film 100 is used in a display system to increase the brightness and the linear prisms have an index of refraction that is greater than about 1.6, the average effective transmission (ETA) of the light redirecting film is not less than about 1.5, or not less than about 1.55, or not less than about 1.6, or not less than about 1.65, or not less than about 1.7, or not less than about 1.75, or not less than about 1.8, or not less than about 1.85.

Microstructures 160 in matte layer 140 are primarily designed to hide undesirable physical defects (such as, for example, scratches) and/or optical defects (such as, for example, undesirably bright or "hot" spots from a lamp in a display or illumination system) with no, or very little adverse, effect on the capabilities of the light redirecting film to redirect light and enhance brightness. In such cases, second major surface 120 has an optical haze that is not greater than about 5%, or not greater than about 4.5%, or not greater than about 4%, or not greater than about 3.5%, or not greater than about 3%, or not greater than about 2.5%, or not greater than about 2%, or not greater than about 1.5%, or not greater than about 1%; and an optical clarity that is not greater than about 85%, or not greater than about 80%, or not greater than about 75%, or not greater than about 70%, or not greater than about 65%, or not greater than about 60%.

Optical haze, as used herein, is defined as the ratio of the transmitted light that deviates from the normal direction by more than 4 degrees to the total transmitted light. Haze values disclosed herein were measured using a Haze-Gard Plus haze meter (available from BYK-Gardiner, Silver Springs, Md.) according to the procedure described in ASTM D1003. Optical clarity, as used herein, refers to the ratio $(T_1-T_2)/(T_1+T_2)$, where $T_1$ is the transmitted light that deviates from the normal direction between 1.6 and 2 degrees from the normal direction, and $T_2$ is the transmitted light that lies between zero and 0.7 degrees from the normal direction. Clarity values disclosed herein were measured using a Haze-Gard Plus haze meter from BYK-Gardiner.

Figure 3A:
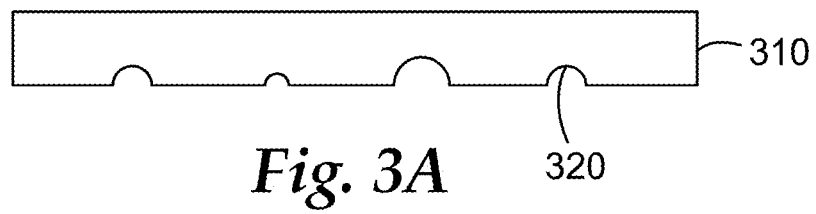
FIG. 3A is a schematic side-view of recessed microstructures.
Figure 3B:
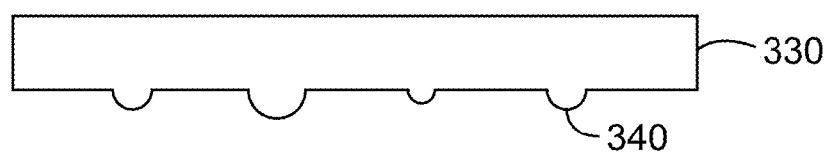
FIG. 3B is a schematic side-view of protruding microstructures.

Microstructures 160 can be any type microstructures that may be desirable in an application. In some cases, microstructures 160 can be recessions. For example, FIG. 3A is a schematic side-view of a matte layer 310 that is similar to matte layer 140 and includes recessed microstructures 320. In some cases, microstructures 160 can be protrusions. For example, FIG. 3B is a schematic side-view of a matte layer 330 that is similar to matte layer 140 and includes protruding microstructures 340.

Figure 4A:
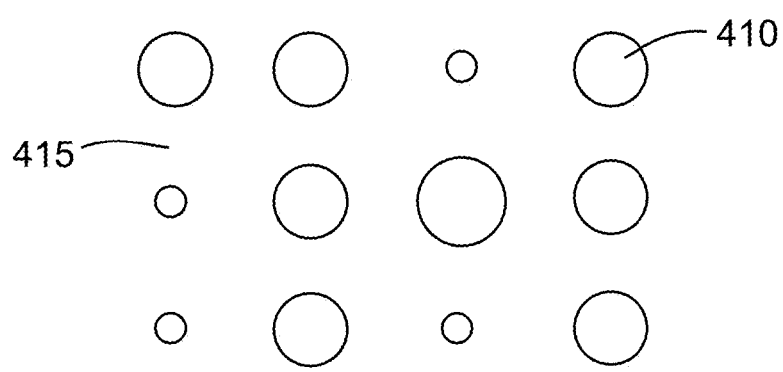
FIG. 4A is a schematic top-view of regularly arranged microstructures.
Figure 4B:
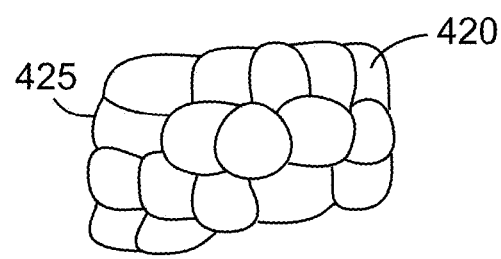
FIG. 4B is a schematic top-view of irregularly arranged microstructures.

In some cases, microstructures 160 form a regular pattern. For example, FIG. 4A is a schematic top-view of microstructures 410 that are similar to microstructures 160 and form a regular pattern in a major surface 415. In some cases, microstructures 160 form an irregular pattern. For example, FIG. 4B is a schematic top-view of microstructures 420 that are similar to microstructures 160 and form an irregular pattern. In some cases, microstructures 160 form a pseudo-random pattern that appears to be random.

In general, microstructures 160 can have any height and any height distribution. In some cases, the average height (that is, the average maximum height minus the average minimum height) of microstructures 160 is not greater than about 5 microns, or not greater than about 4 microns, or not greater than about 3 microns, or not greater than about 2 microns, or not greater than about 1 micron, or not greater than about 0.9 microns, or not greater than about 0.8 microns, or not greater than about 0.7 microns.

Figure 5:
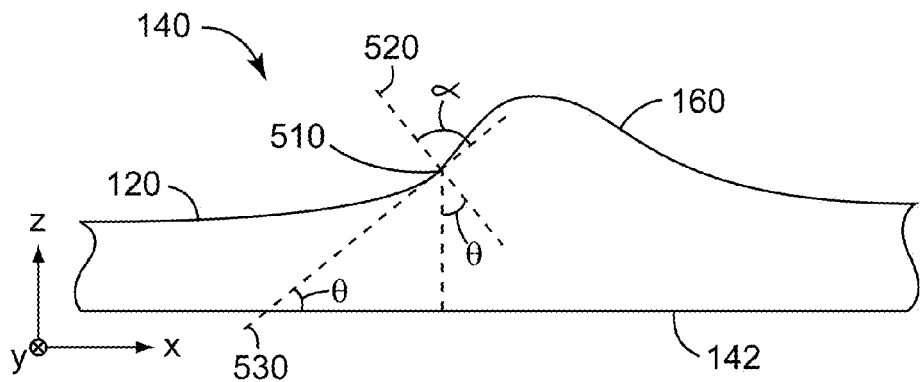
FIG. 5 is a schematic side-view of a microstructure.

FIG. 5 is a schematic side view of a portion of matte layer 140. In particular, FIG. 5 shows a microstructure 160 in major surface 120 and facing major surface 142. Microstructure 160 has a slope distribution across the surface of the microstructure. For example, the microstructure has a slope $\theta$ at a location 510 where $\theta$ is the angle between normal line 520 which is perpendicular to the microstructure surface at location 510 ($\alpha$=90 degrees) and tangent line 530 which is tangent to the microstructure surface at the same location. Slope $\theta$ is also the angle between tangent line 530 and major surface 142 of the matte layer.

Figure 6:
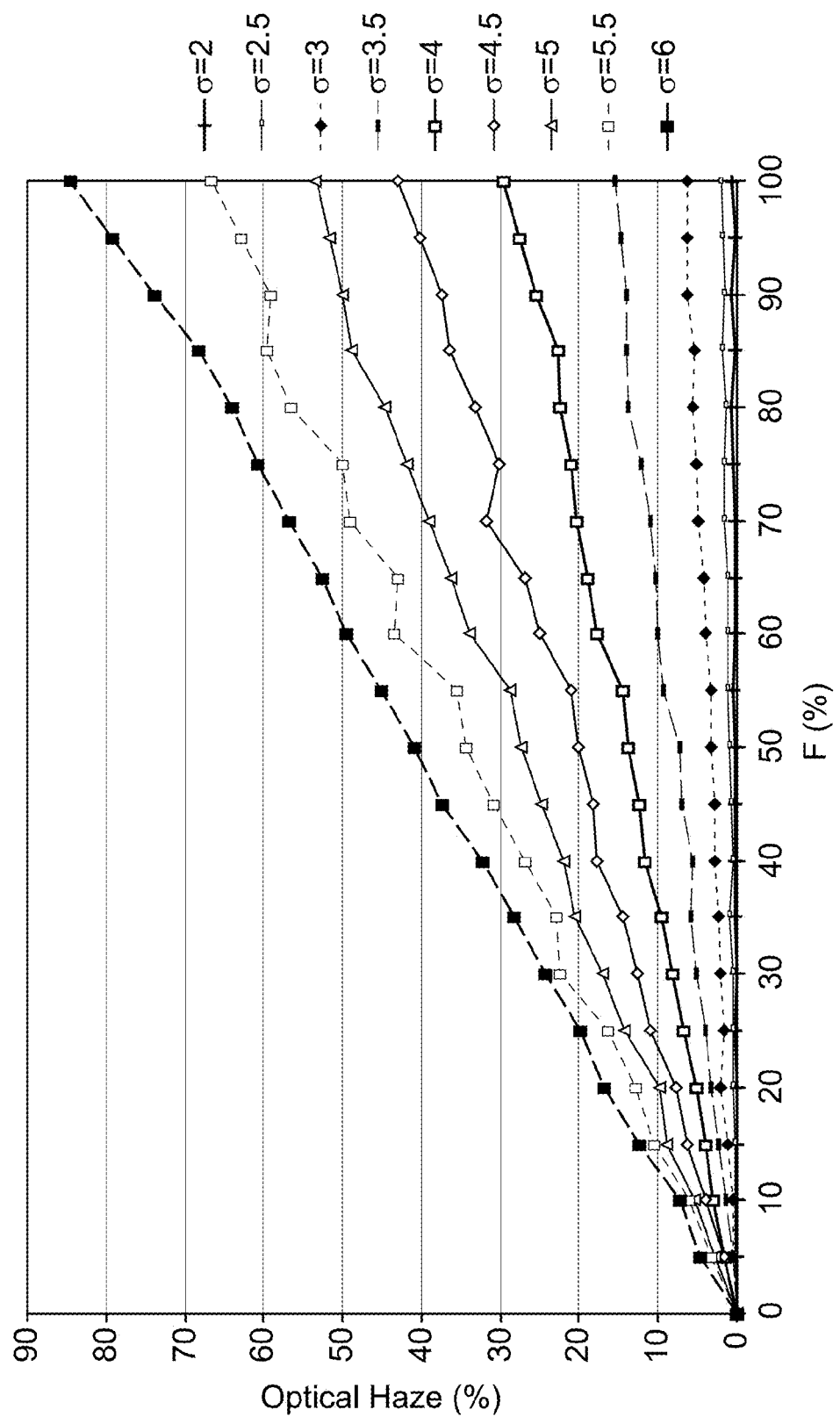
FIG. 6 is calculated optical haze versus surface fraction "f"
Figure 7:
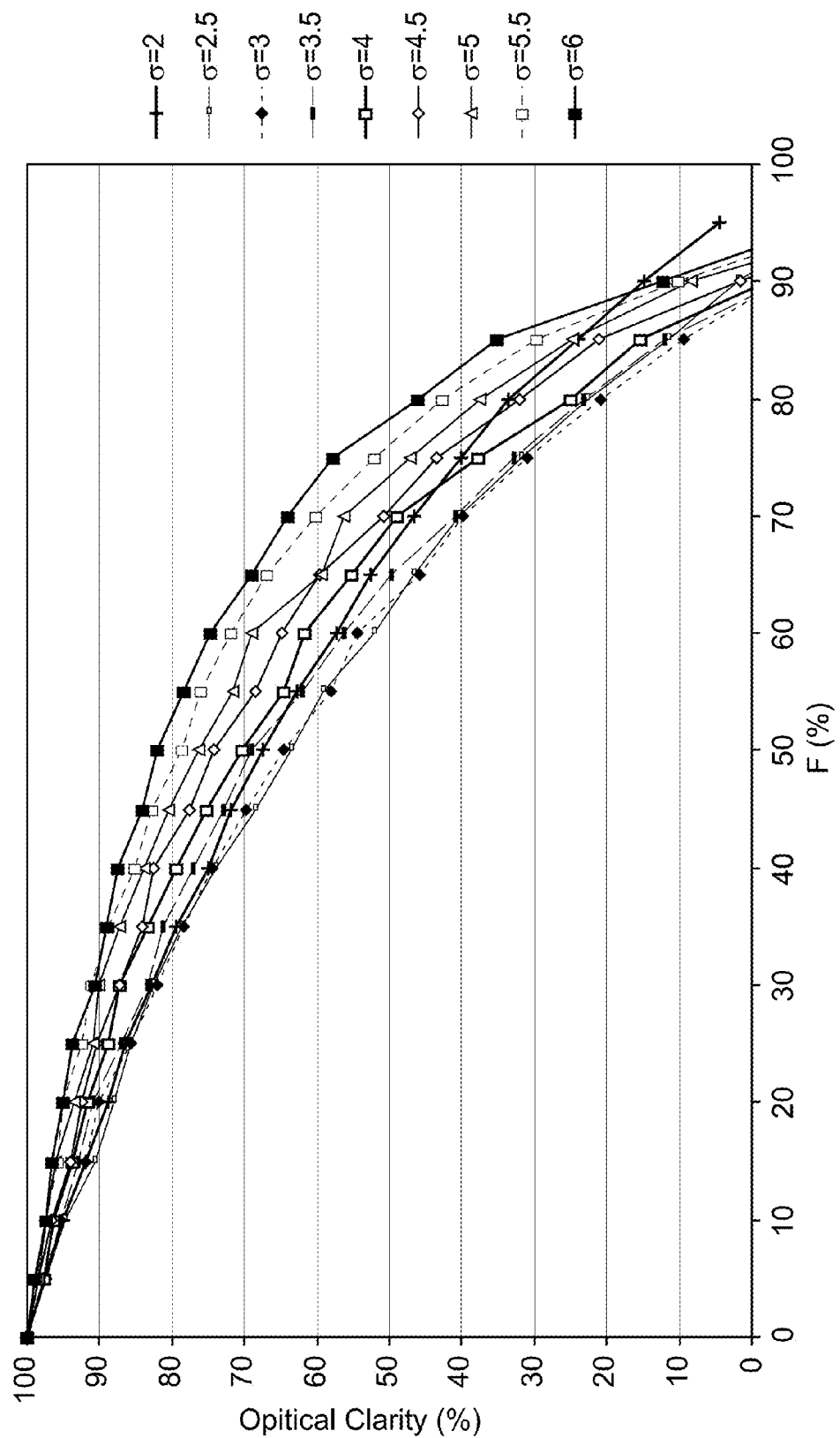
FIG. 7 is calculated optical clarity versus surface fraction "f"

Optical haze and clarity of matte layer 140 were calculated using a program that was similar to commercially available ray tracing programs such as, for example, TracePro (available from Lambda Research Corp., Littleton, Mass.). In carrying out the calculations, it was assumed that each microstructure had a Gaussian slope distribution with a half width at half maximum (HWHM) equal to $\sigma$. It was further assumed that the matte layer had an index of refraction equal to 1.5. The calculated results are shown in FIGS. 6 and 7. FIG. 6 is the calculated optical haze versus surface fraction "f" for nine different values of $\sigma$, where f is percent area of major surface 120 covered by microstructures 160. FIG. 7 is the calculated optical clarity versus f. In some cases, such as when microstructures 160 effectively hide physical and/or optical defects without reducing or reducing very little the brightness, the plurality of microstructures 160 covers at least about 70%, or at least about 75%, or at least about 80%, or at least about 85%, or at least about 90%, or at least about 95%, of second major surface 120. In some cases, such as when the microstructures have a Gaussian or normal slope distribution, the HWHM $\sigma$ of the distribution is not greater than about 4.5 degrees, or not greater than about 4 degrees, or not greater than about 3.5 degrees, or not greater than about 3 degrees, or not greater than about 2.5 degrees, or not greater than about 2 degrees.

In the exemplary calculations disclosed above, it was assumed that microstructures 160 have a Gaussian slope distribution with a HWHM equal to $\sigma$. In general, the microstructures can have any distribution that may be desirable in an application. For example, in some cases, such as when the microstructures are spherical segments, the microstructures can have a uniform distribution between two limiting angles. Other exemplary slope distributions include Lorentzian distributions, parabolic distributions, and combinations of different, such as Gaussian, distributions. For example, in some cases, the microstructures can have a first Gaussian distribution with a smaller HWHM $\sigma_1$ added to, or combined with, a second Gaussian distribution with a larger HWHM $\sigma_2$. In some cases, the microstructures can have asymmetric slope distributions. In some cases, the microstructures can have symmetric distributions.

Figure 8:
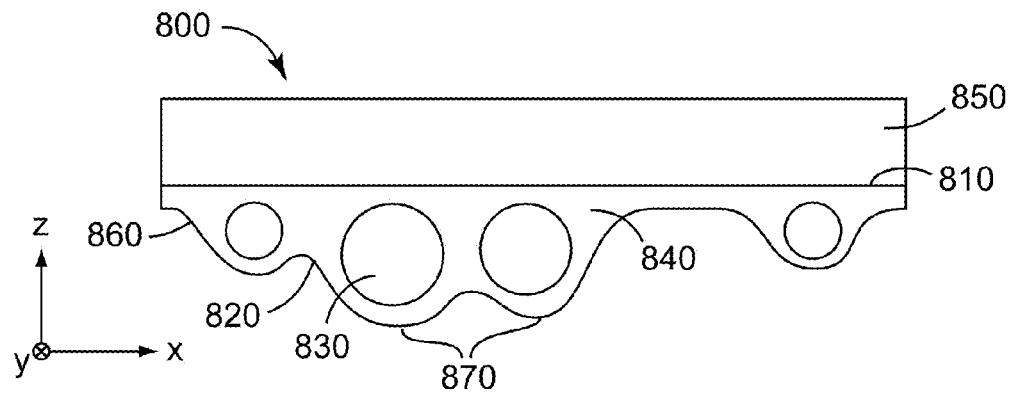
FIG. 8 is a schematic side-view of an optical film.

FIG. 8 is a schematic side-view of an optical film 800 that includes a matte layer 860 disposed on a substrate 850 similar to substrate 170. Matte layer 860 includes a first major surface 810 attached to substrate 850, a second major surface 820 opposite the first major surface, and a plurality of particles 830 dispersed in a binder 840. Second major surface 820 includes a plurality of microstructures 870. A substantial portion, such as at least about 50%, or at least about 60%, or at least about 70%, or at least about 80%, or at least about 90%, of microstructures 870 are disposed on and formed primarily because of particles 830. In other words, particles 830 are the primary reason for the formation of microstructures 870. In such cases, particles 830 have an average size that is greater than about 0.25 microns, or greater than about 0.5 microns, or greater than about 0.75 microns, or greater than about 1 micron, or greater than about 1.25 microns, or greater than about 1.5 microns, or greater than about 1.75 microns, or greater than about 2 microns.

In some cases, matte layer 140 can be similar to matte layer 860 and can include a plurality of particles that are the primary reason for the formation of microstructures 160 in second major surface 120.

Particles 830 can be any type particles that may be desirable in an application. For example, particles 830 may be made of polymethyl methacrylate (PMMA), polystyrene (PS), or any other material that may be desirable in an application. In general, the index of refraction of particles 830 is different than the index of refraction of binder 840, although in some cases, they may have the same refractive indices. For example, particles 830 can have an index of refraction of about 1.35, or about 1.48, or about 1.49, or about 1.50, and binder 840 can have an index of refraction of about 1.48, or about 1.49, or about 1.50.

Figure 9:
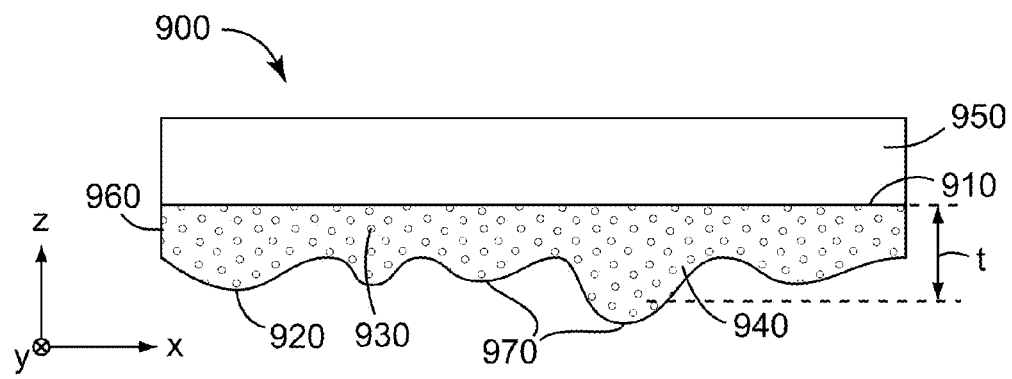
FIG. 9 is a schematic side-view of another optical film.

In some cases, matte layer 140 does not include particles. In some cases, matte layer 140 includes particles, but the particles are not the primary reason for the formation of microstructures 160. For example, FIG. 9 is a schematic side-view of an optical film 900 that includes a matte layer 960 similar to matter layer 140 disposed on a substrate 950 similar to substrate 170. Matte layer 960 includes a first major surface 910 attached to substrate 950, a second major surface 920 opposite the first major surface, and a plurality of particles 930 dispersed in a binder 940. Second major surface 970 includes a plurality of microstructures 970. Even though matte layer 960 includes particles 930, the particles are not the primary reason for the formation of microstructures 970. For example, in some cases, the particles are much smaller than the average size of the microstructures. In such cases, the microstructures can be formed by, for example, microreplicating a structured tool. In such cases, the average size of particles 930 is less than about 0.5 microns, or less than about 0.4 microns, or less than about 0.3 microns, or less than about 0.2 microns, or less than about 0.1 microns. In such cases, a substantial fraction, such as at least about 50%, or at least about 60%, or at least about 70%, or at least about 80%, or at least about 90%, of microstructures 970 are not disposed on particles that have an average size that is greater than about 0.5 microns, or greater than about 0.75 microns, or greater than about 1 micron, or greater than about 1.25 microns, or greater than about 1.5 microns, or greater than about 1.75 microns, or greater than about 2 microns. In some cases, the average size of particles 930 is less than the average size of microstructures 930 by at least a factor of about 2, or at least a factor of about 3, or at least a factor of about 4, or at least a factor of about 5, or at least a factor of about 6, or at least a factor of about 7, or at least a factor of about 8, or at least a factor of about 9, or at least a factor of about 10. In some cases, if matte layer 960 includes particles 930, then matte layer 960 has an average thickness "t" that is greater than the average size of the particles by at least about 0.5 microns, or at least about 1 micron, or at least about 1.5 microns, or at least about 2 microns, or at least about 2.5 microns, or at least about 3 microns. In some cases, if the matte layer includes a plurality of particles then the average thickness of the matte layer is greater than the average thickness of the particles by at least a factor of about 2, or at least a factor of about 3, or at least a factor of about 4, or at least a factor of about 5, or at least a factor of about 6, or at least a factor of about 7, or at least a factor of about 8, or at least a factor of about 9, or at least a factor of about 10.

Referring back to FIG. 1, in some cases, light redirecting film 100 has small particles in at least some of the layers, such as prism layer 130, substrate layer 170, or matte layer 140, for increasing the index of refraction of the layer. For example, one or more layers in light redirecting film 100 can include inorganic nanoparticles such as silica or zirconia nanoparticles discussed in, for example U.S. Pat. No. 7,074,463 (Jones et al.) and U.S. Patent Publication No. 2006/0210726. In some cases, light redirecting film 100 does not include any particles having an average size that is greater than about 2 microns, or about 1.5 microns, or about 1 micron, or about 0.75 microns, or about 0.5 microns, or about 0.25 microns, or about 0.2 microns, or about 0.15 microns, or about 0.1 microns.

Microstructures 160 can be made using any fabrication method that may be desirable in an application. For example, the microstructures can be fabricated using microreplication from a tool, where the tool may be fabricated using any available fabrication method, such as by using engraving or diamond turning. Exemplary diamond turning systems and methods can include and utilize a fast tool servo (FST) as described in, for example, PCT Published Application No. WO 00/48037, and U.S. Pat. Nos. 7,350,442 and 7,328,638, the disclosures of which are incorporated in their entireties herein by reference thereto.

Figure 10:
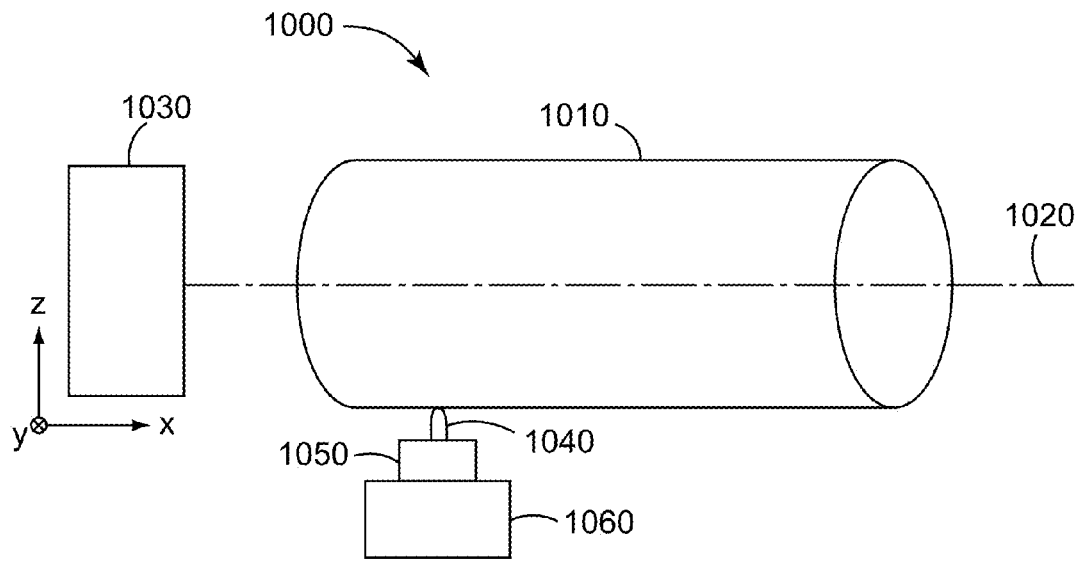
FIG. 10 is a schematic side-view of a cutting tool system.

FIG. 10 is a schematic side-view of a cutting tool system 1000 that can be used to cut a tool which can be microreplicated to produce microstructures 160 and matte layer 140. Cutting tool system 1000 employs a thread cut lathe turning process and includes a roll 1010 that can rotate around and/or move along a central axis 1020 by a driver 1030, and a cutter 1040 for cutting the roll material. The cutter is mounted on a servo 1050 and can be moved into and/or along the roll along the x-direction by a driver 1060. In general, cutter 1040 is mounted normal to the roll and central axis 1020 and is driven into the engraveable material of roll 1010 while the roll is rotating around the central axis. The cutter is then driven parallel to the central axis to produce a thread cut. Cutter 1040 can be simultaneously actuated at high frequencies and low displacements to produce features in the roll that when microreplicated result in microstructures 160.

Servo 1050 is a fast tool servo (FTS) and includes a solid state piezoelectric (PZT) device, often referred to as a PZT stack, which rapidly adjusts the position of cutter 1040. FTS 1050 allows for highly precise and high speed movement of cutter 1040 in the x-, y- and/or z-directions, or in an off-axis direction. Servo 1050 can be any high quality displacement servo capable of producing controlled movement with respect to a rest position. In some cases, servo 1050 can reliably and repeatably provide displacements in a range from 0 to about 20 microns with about 0.1 micron or better resolution.

Driver 1060 can move cutter 1040 along the x-direction parallel to central axis 1020. In some cases, the displacement resolution of driver 1060 is better than about 0.1 microns, or better than about 0.01 microns. Rotary movements produced by driver 1030 are synchronized with translational movements produced by driver 1060 to accurately control the resulting shapes of microstructures 160.

The engraveable material of roll 1010 can be any material that is capable of being engraved by cutter 1040. Exemplary roll materials include metals such as copper, various polymers, and various glass materials.

Figure 11A:
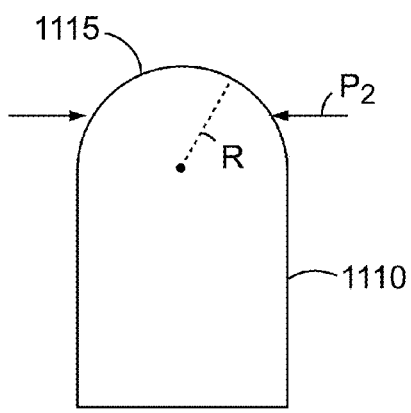
FIGS. 11A-11D are schematic side-views of various cutters.

Cutter 1040 can be any type of cutter and can have any shape that may be desirable in an application. For example, FIG. 11A is a schematic side-view of a cutter 1110 that has an arc-shape cutting tip 1115 with a radius "R". In some cases, the radius R of cutting tip 1115 is at least about 100 microns, or at least about 150 microns, or at least about 200 microns, or at least about 300 microns, or at least about 400 microns, or at least about 500 microns, or at least about 1000 microns, or at least about 1500 microns, or at least about 2000 microns, or at least about 2500 microns, or at least about 3000 microns.

Figure 11B:
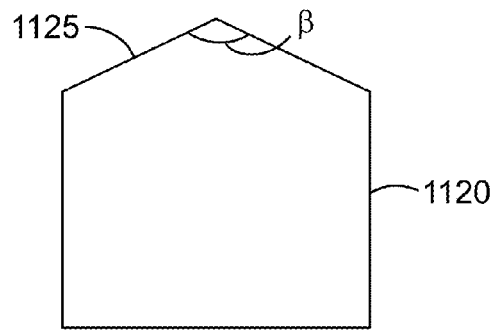
Figure 11C:
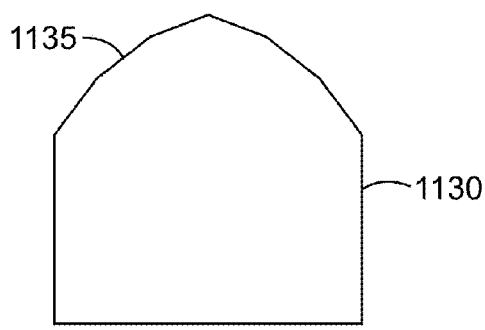
Figure 11D:
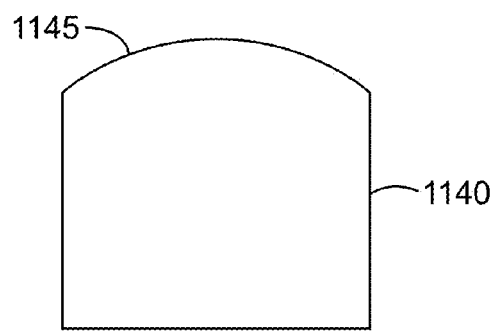

As another example, FIG. 11B is a schematic side-view of a cutter 1120 that has a V-shape cutting tip 1125 with an apex angle $\beta$. In some cases, the apex angle $\beta$ of cutting tip 1125 is at least about 100 degrees, or at least about 110 degrees, or at least about 120 degrees, or at least about 130 degrees, or at least about 140 degrees, or at least about 150 degrees, or at least about 160 degrees, or at least about 170 degrees. As yet other examples, FIG. 11C is a schematic side-view of a cutter 1130 that has a piece-wise linear cutting tip 1135, and FIG. 11D is a schematic side-view of a cutter 1140 that has a curved cutting tip 1145.

Referring back to FIG. 10, the rotation of roll 1010 along central axis 1020 and the movement of cutter 1040 along the x-direction while cutting the roll material defines a thread path around the roll that has a pitch $P_1$ along the central axis. As cutter moves along a direction normal to the roll surface to cut the roll material, the width of the material cut by the cutter changes as the cutter moves or plunges in and out. Referring to, for example FIG. 11A, the maximum penetration depth by the cutter corresponds to a maximum width $P_2$ cut by the cutter. In some cases, such as when microstructures 160 in light redirecting film 100 are geometrically symmetric and sufficiently capable of hiding or masking physical and/or optical defects without reducing, or reducing very little, the brightness, the ratio $P_2/P_1$ is in a range from about 1.5 to about 6, or from about 2 to about 5, or from about 2.5 to about 4.

Figure 12:
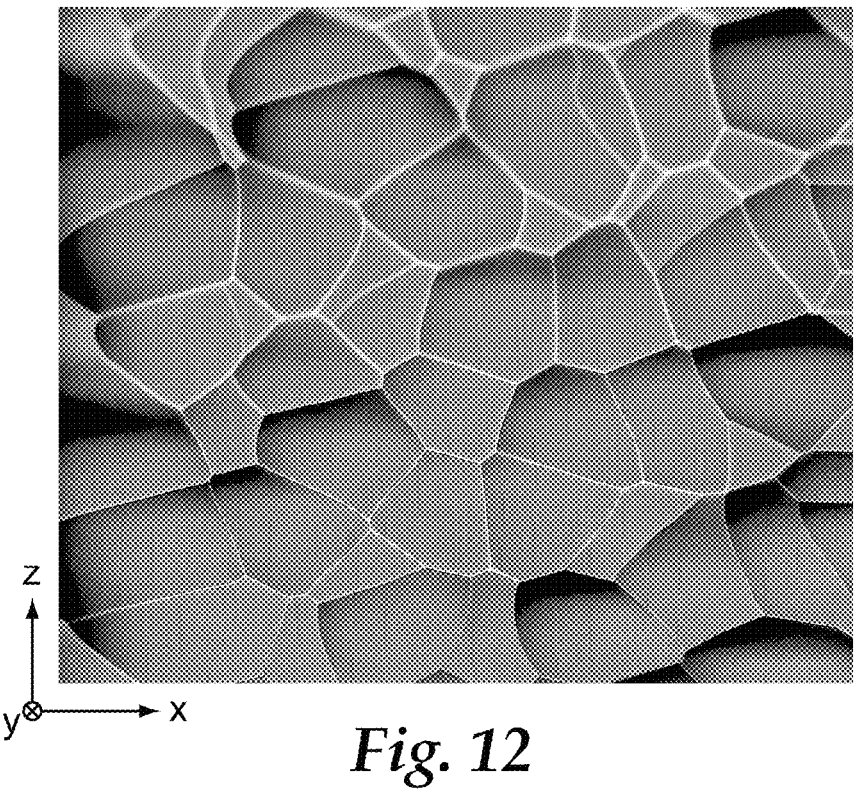
FIGS. 12-17 are optical micrographs of various microstructured surfaces.
Figure 13:
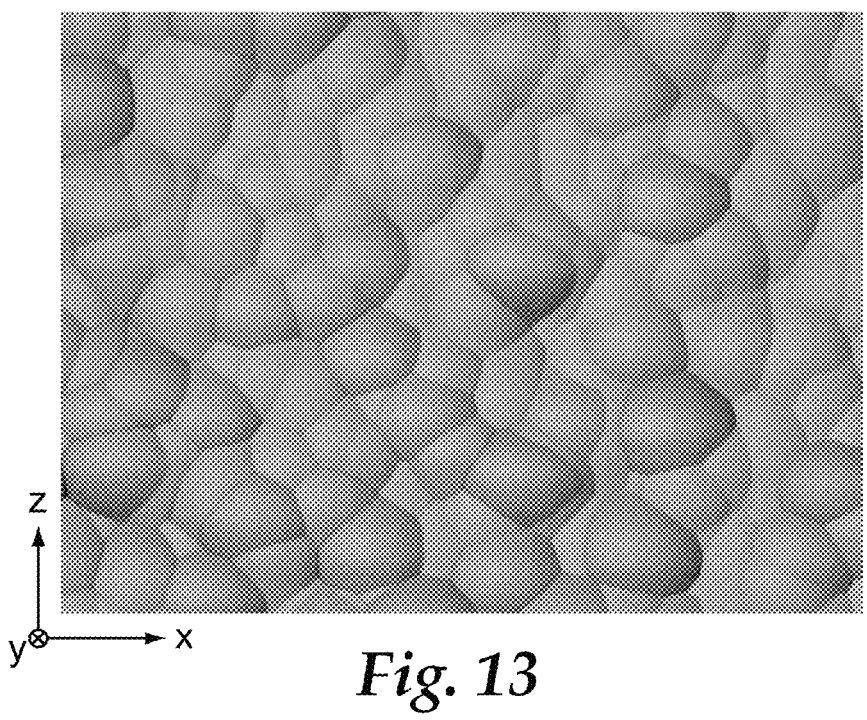
Figure 14:
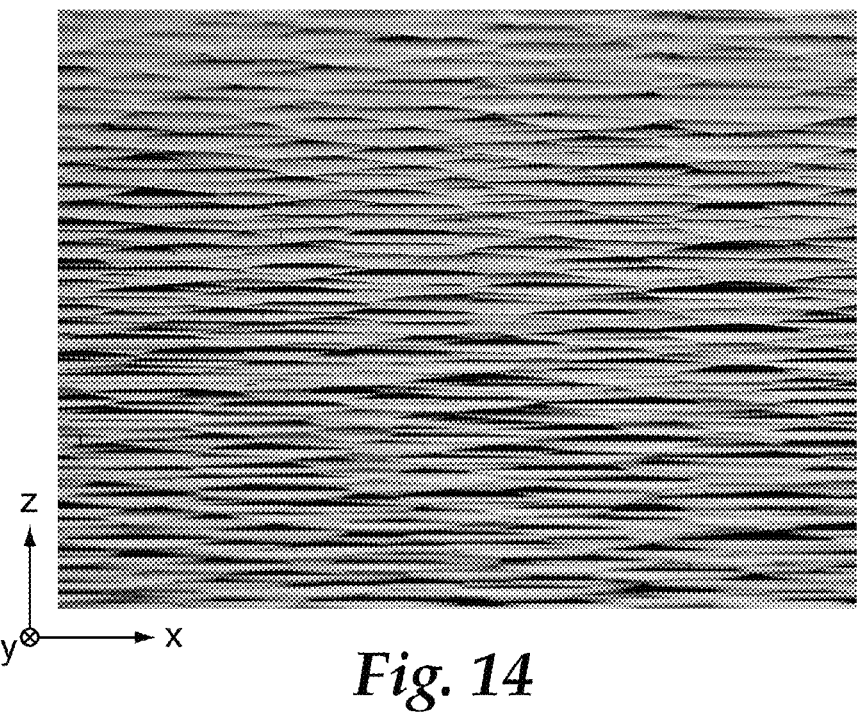
Figure 15:
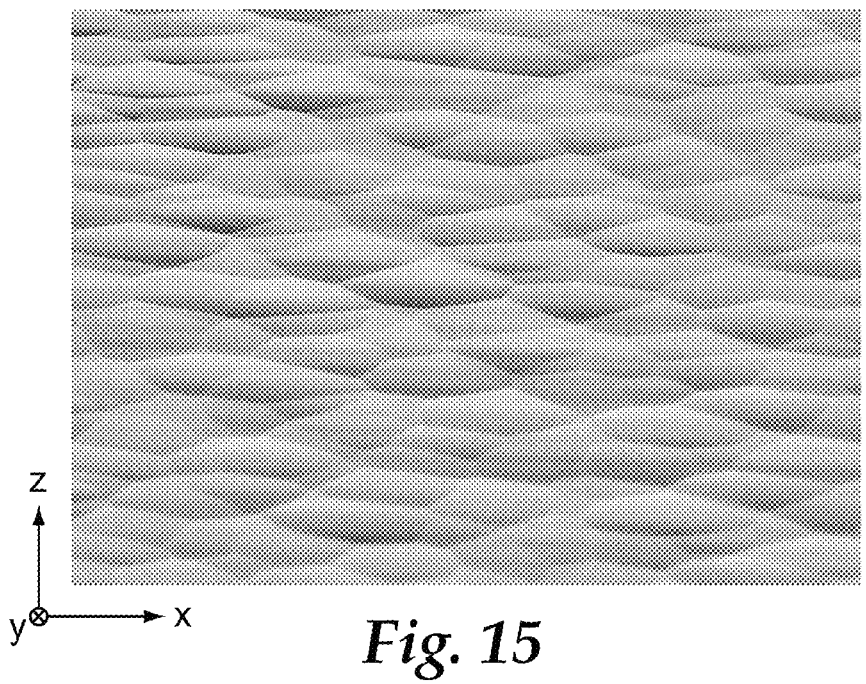
Figure 16:
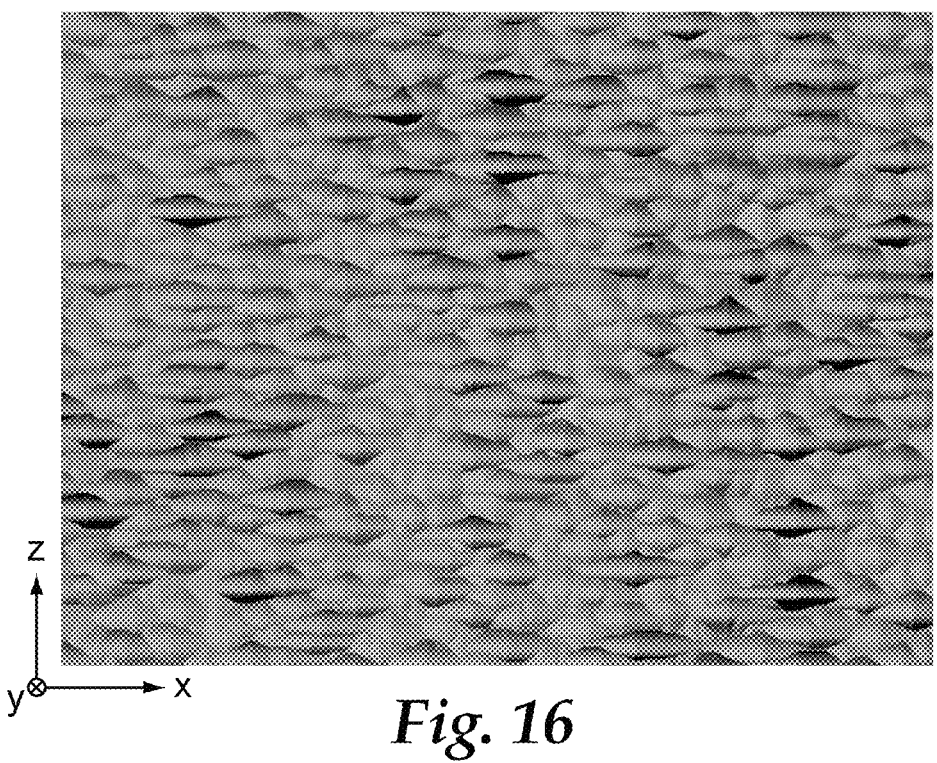
Figure 17:
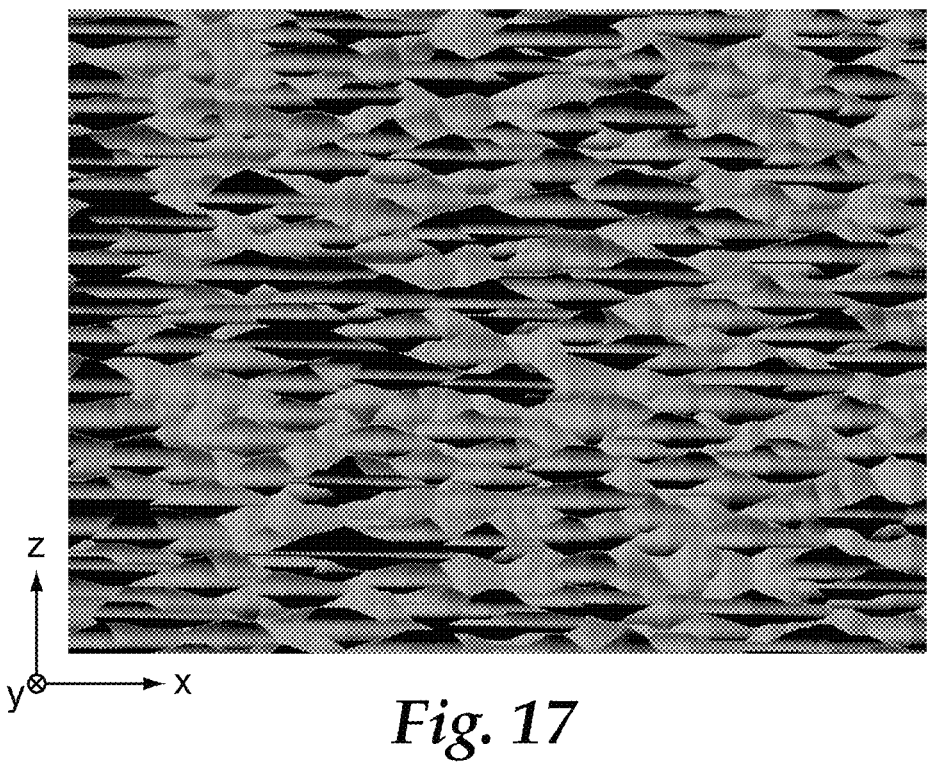

Several samples having microstructures similar to microstructures 160 were made using a cutting tool system similar to cutting tool system 1000 to make a patterned roll and subsequently microreplicating the patterned tool to make matte layers similar to matter layer 140. FIG. 12 is a top-view optical micrograph of a sample that was made using a cutter similar to cutter 1110 where the radius of the cutting tip 1115 was about 480 microns. The sample was geometrically symmetric and had a symmetric slope distribution, where by geometrically symmetric it is meant that the average microstructure size along one direction, such as the x-direction, is substantially the same as the average microstructure size along an orthogonal direction, such as the y-direction. In particular, the sample had an average slope magnitude of about 1.18 degrees along the x-direction and an average slope magnitude of about 1.22 degrees along the y-direction. FIG. 13 is a top-view optical micrograph of a sample that was made using a cutter similar to cutter 1110 where the radius of the cutting tip 1115 was about 480 microns. The sample was geometrically symmetric and had an asymmetric slope distribution. In particular, the sample had an average slope magnitude of about 0.72 degrees along the x-direction and an average slope magnitude of about 1.11 degrees along the y-direction. FIG. 14 is a top-view optical micrograph of a sample that was made using a cutter similar to cutter 1110 where the radius of the cutting tip 1115 was about 3300 microns. The sample was geometrically asymmetric and had an asymmetric slope distribution. In particular, the sample had an average slope magnitude of about 0.07 degrees along the x-direction and an average slope magnitude of about 1.48 degrees along the y-direction. FIG. 15 is a top-view optical micrograph of a sample that was made using a cutter similar to cutter 1110 where the radius of the cutting tip 1115 was about 3300 microns. The sample was geometrically asymmetric and had an asymmetric slope distribution. In particular, the sample had an average slope magnitude of about 0.18 degrees along the x-direction and an average slope magnitude of about 0.85 degrees along the y-direction. FIG. 16 is a top-view optical micrograph of a sample that was made using a cutter similar to cutter 1120 where the apex angle of the cutting tip 1125 was about 176 degrees. The sample was geometrically symmetric and had a symmetric slope distribution. In particular, the sample had an average slope magnitude of about 2.00 degrees along the x-direction and an average slope magnitude of about 1.92 degrees along the y-direction. FIG. 17 is a top-view optical micrograph of a sample that was made using a cutter similar to cutter 1120 where the apex angle of the cutting tip 1125 was about 175 degrees. The sample was geometrically asymmetric and had a symmetric slope distribution. In particular, the sample had an average slope magnitude of about 2.50 degrees along the x-direction and an average slope magnitude of about 2.54 degrees along the y-direction.

Figure 18A:
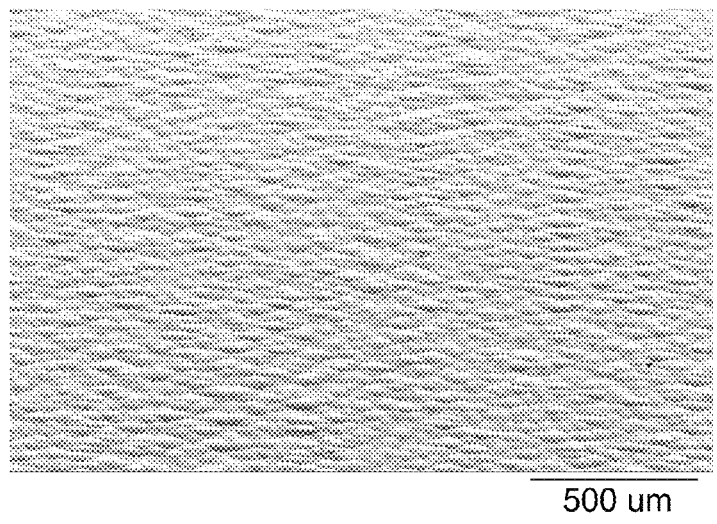
FIGS. 18A, 18B and 18C are SEM images of various microstructured surfaces at different magnifications.
Figure 18B:
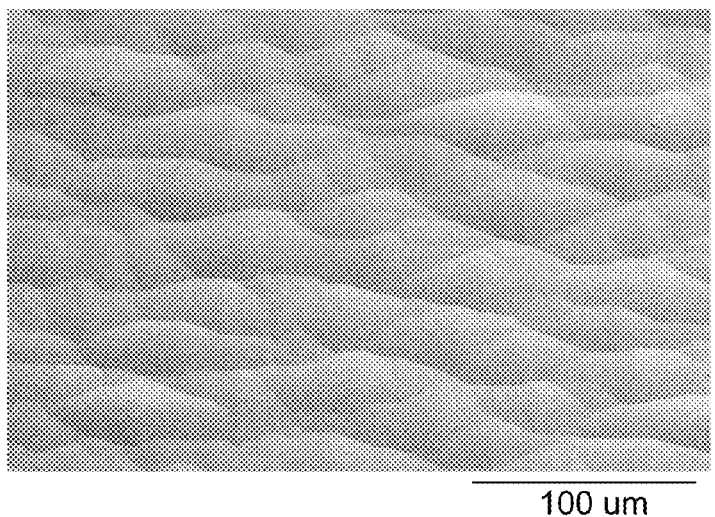
Figure 18C:
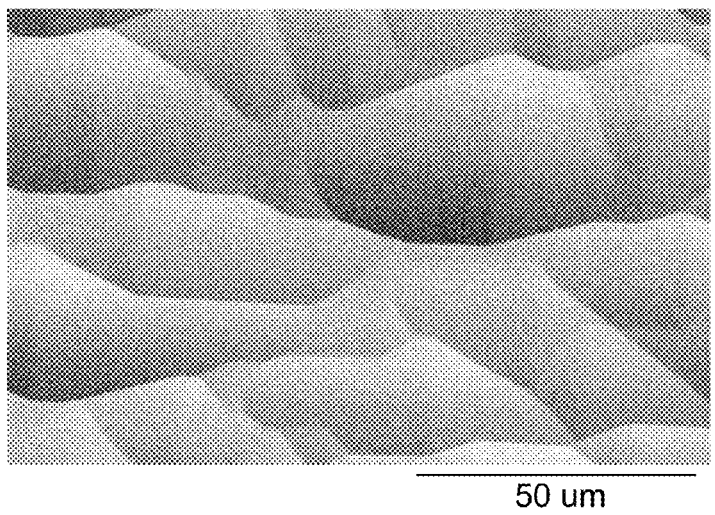
Figure 19A:
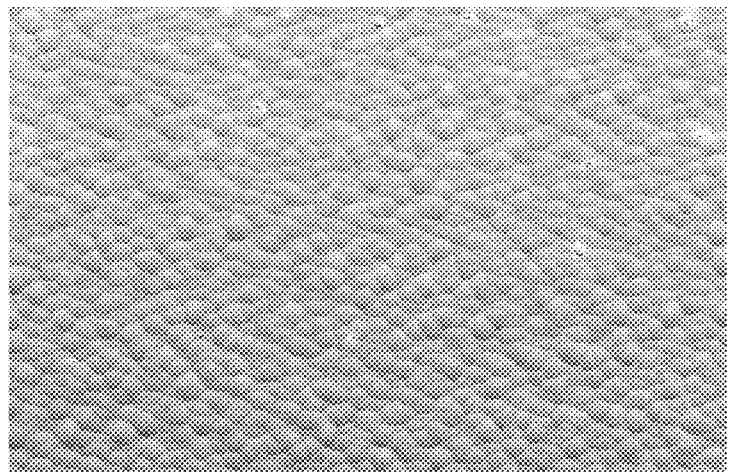
FIGS. 19A, 19B and 19C are SEM images of various microstructured surfaces at different magnifications.
Figure 19B:
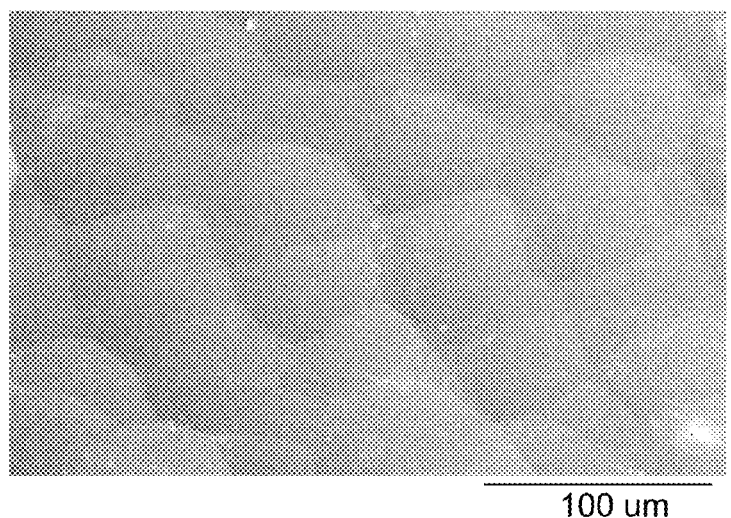
Figure 19C:
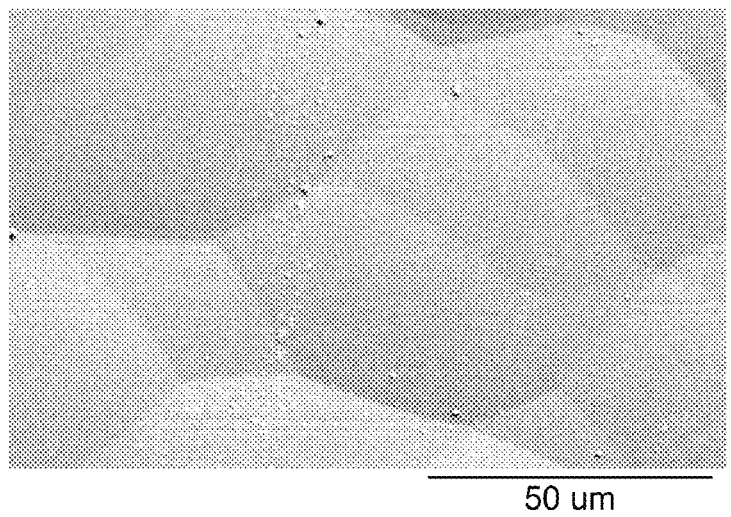
Figure 20A:
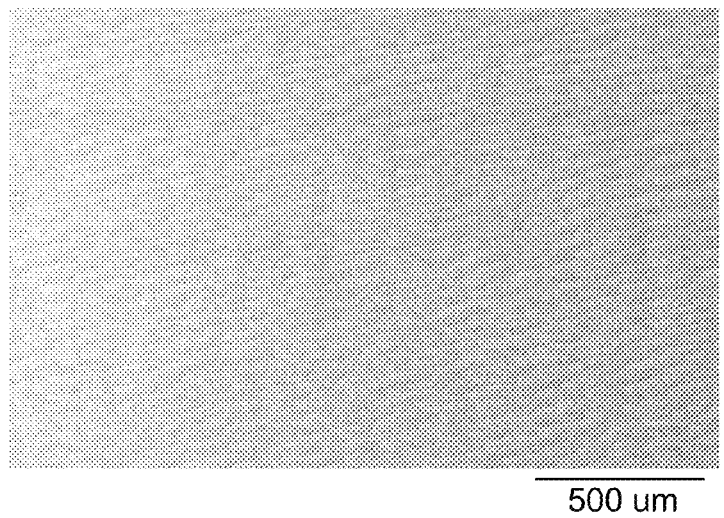
FIGS. 20A, 20B and 20C are SEM images of various microstructured surfaces at different magnifications.
Figure 20B:
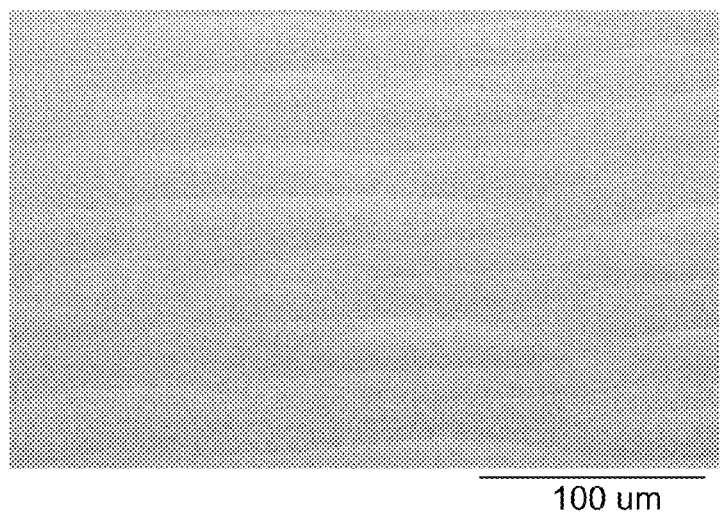
Figure 20C:
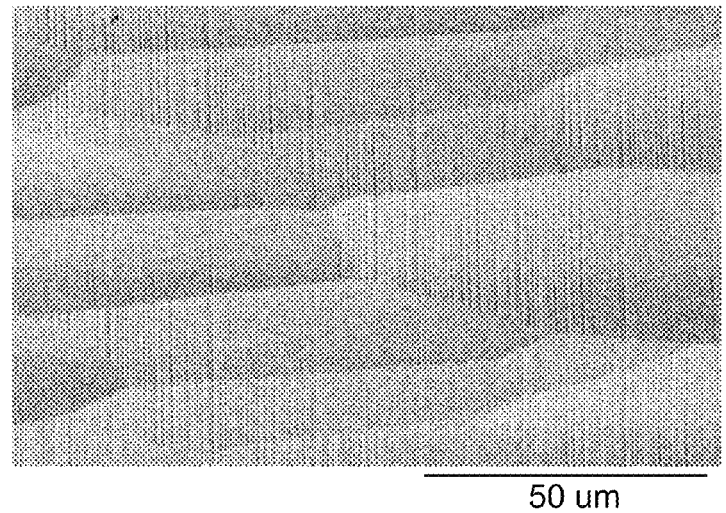

FIGS. 18A-18C are top-view scanning electron micrographs (SEMs) of a sample at three different magnifications. The sample was made using a cutter similar to cutter 1120 where the apex angle of the cutting tip 1125 was about 176 degrees. The sample was geometrically symmetric. Using confocal microscopy, the average height of the microstructures was measured to be about 2.67 microns. FIGS. 19A-19C are top-view SEMs of a sample at three different magnifications. The sample was made using a cutter similar to cutter 1110 where the radius of the cutting tip 1115 was about 480 microns. The sample was geometrically symmetric. Using confocal microscopy, the average height of the microstructures was measured to be about 2.56 microns. FIGS. 20A-20C are top-view SEMs of a sample at three different magnifications. The sample was made using a cutter similar to cutter 1110 where the radius of the cutting tip 1115 was about 3300 microns. The sample was geometrically asymmetric. Using confocal microscopy, the average height of the microstructures was measured to be about 1.46 microns.

Figure 21:
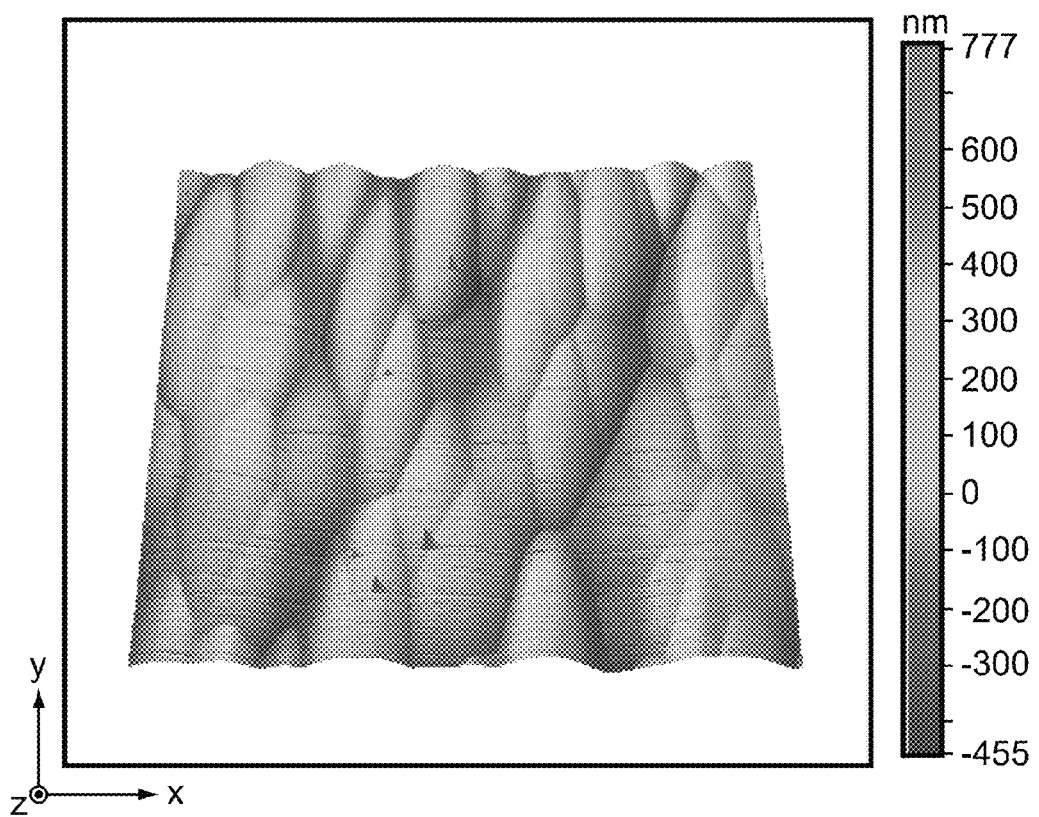
FIG. 21 is an AFM surface profile of a microstructured surface.
Figure 22A:
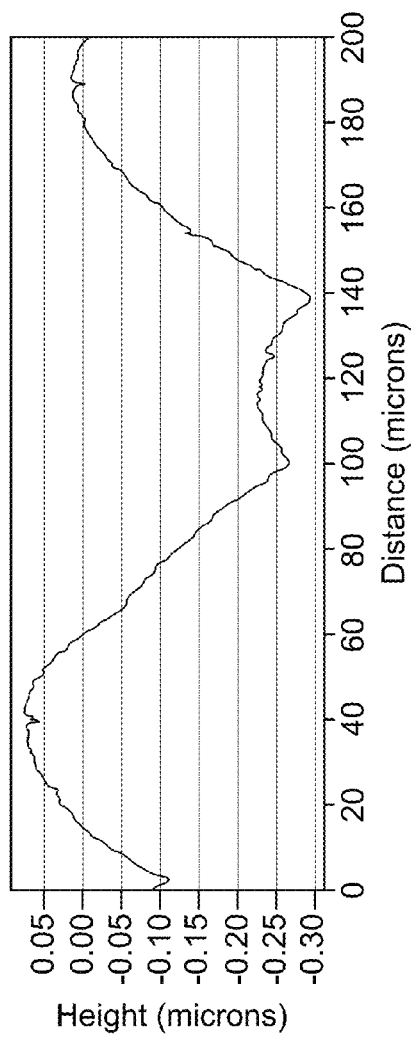
FIG. 22A-22B are cross-sectional profiles of the microstructured surface in FIG. 21 along two mutually orthogonal directions.
Figure 22B:
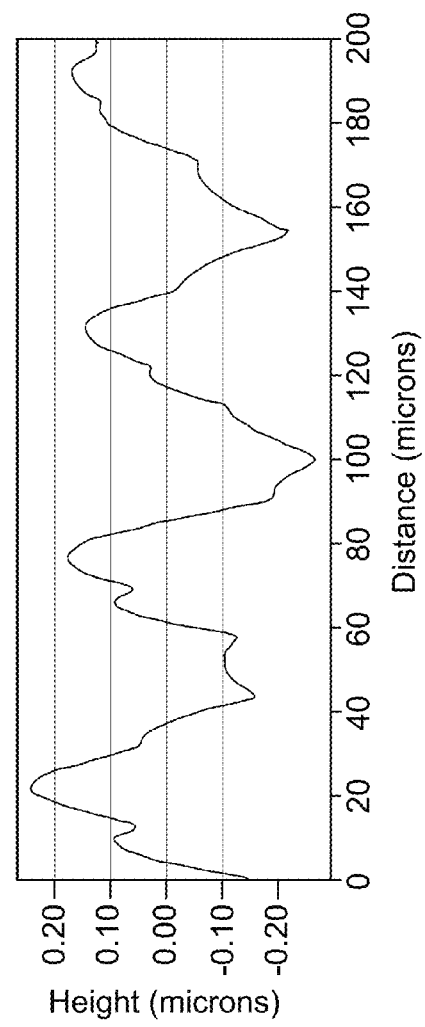
Figure 23:
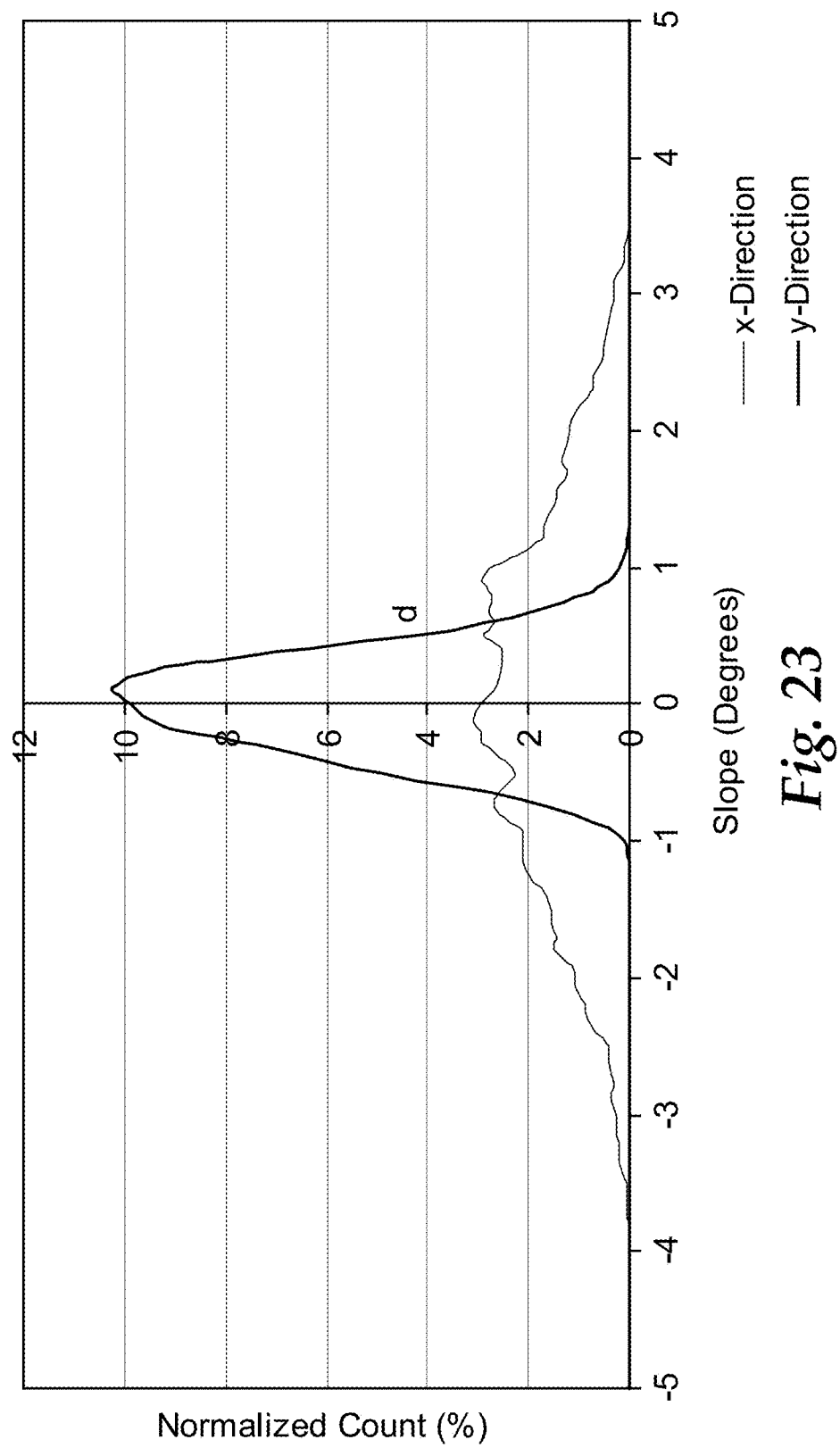
FIG. 23 is percent slope distribution for the microstructured surface in FIG. 21 along two mutually orthogonal directions.
Figure 24:
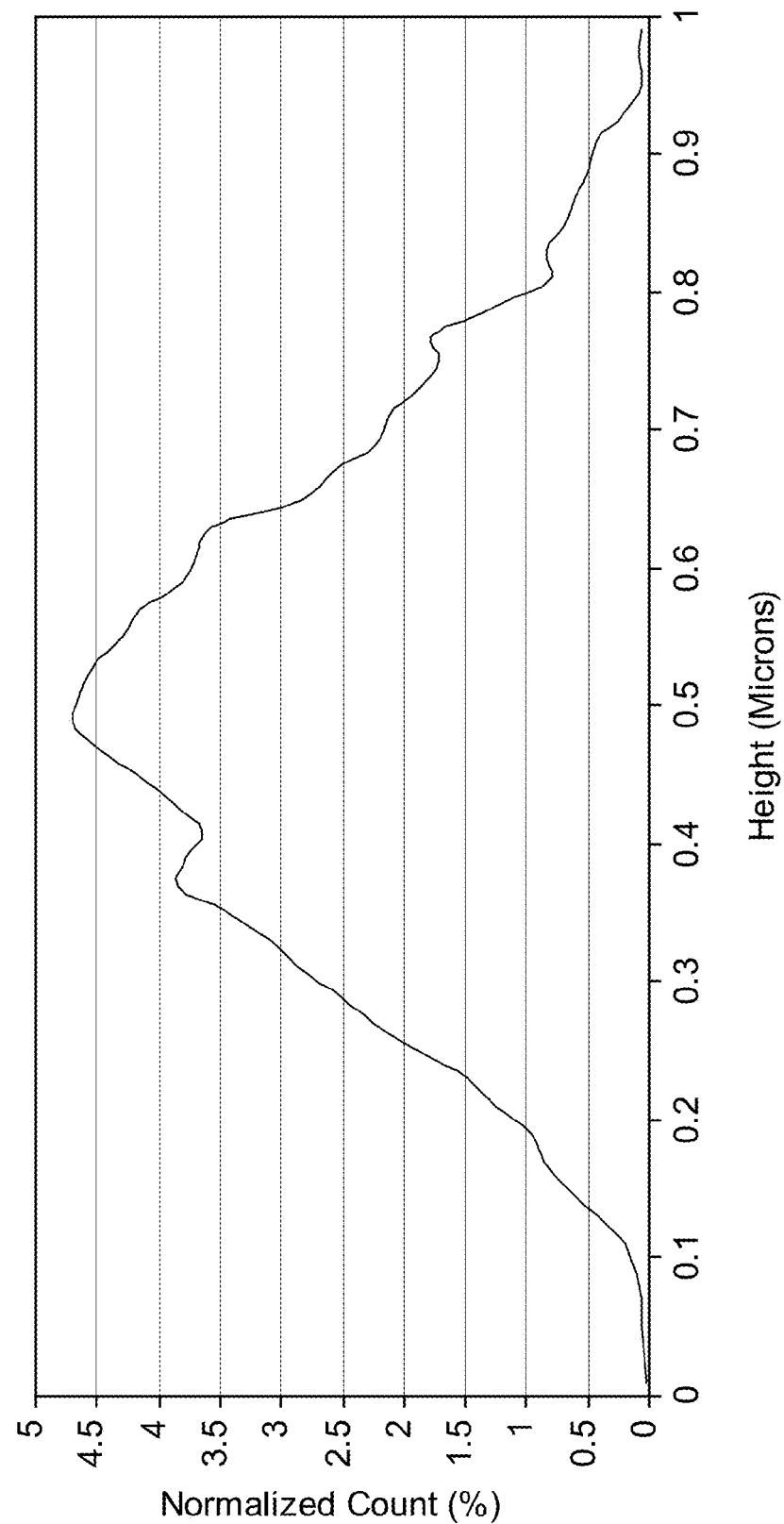
FIG. 24 is percent height distribution for the microstructured surface in FIG. 21.
Figure 25:
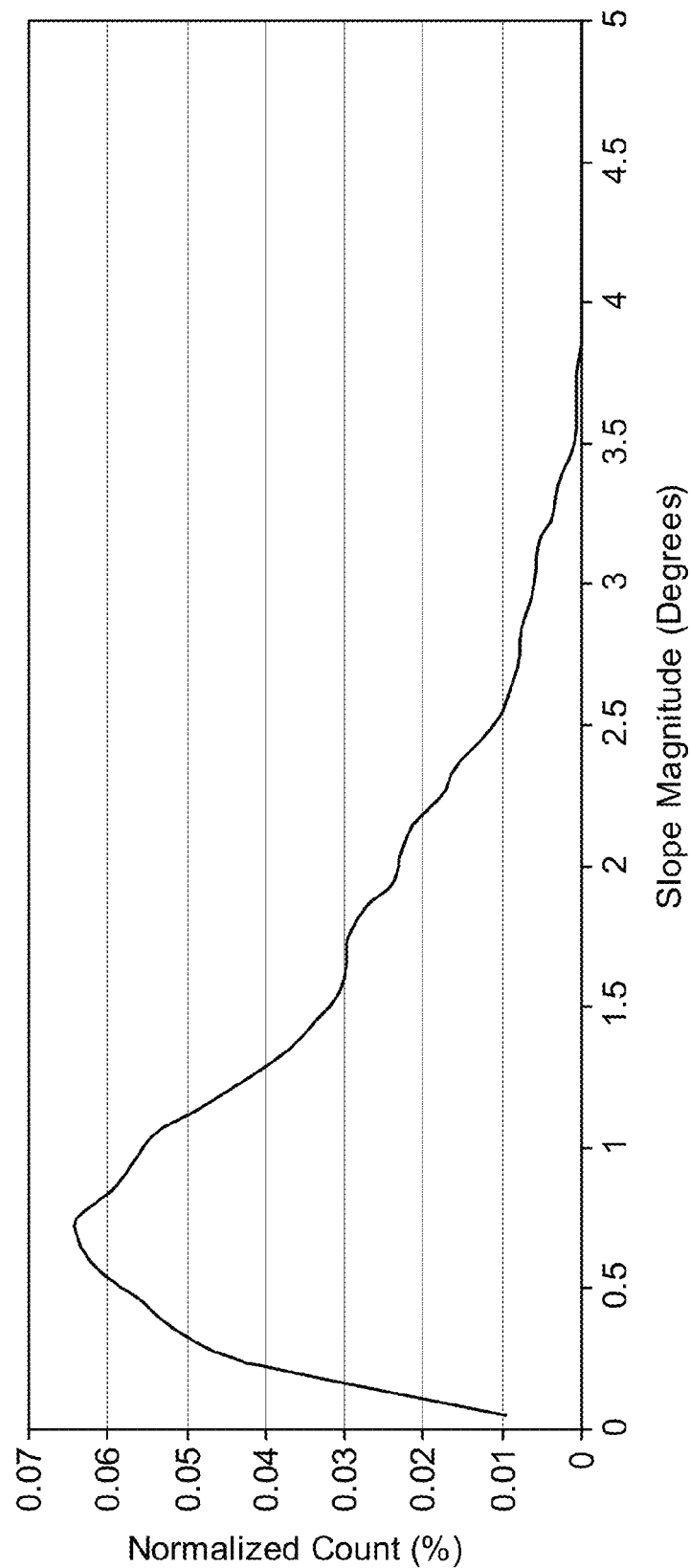
FIG. 25 is percent slope magnitude distribution for the microstructured surface in FIG. 21.

The surfaces of a number of samples fabricated using the process outlined above were characterized over an area of about 200 microns by about 200 microns using atomic force microscopy (AFM). FIG. 21 is an exemplary AFM surface profile of one such sample, labeled sample A. The sample had an optical transmission of about 94.9%, an optical haze of about 1.73%, and an optical clarity of about 79.5%. FIGS. 22A and 22B are exemplary cross-sectional profiles of sample A along the x- and y-directions, respectively. FIG. 23 shows the percent slope distribution along the x- and y-directions for sample A. Slopes $S_x$ and $S_y$ along respective x- and y-directions were calculated from the following two expressions:

$$S_x = \partial H(x,y)/\partial x \quad (1)$$

$$S_y = \partial H(x,y)/\partial y \quad (2)$$

where H(x,y) is the surface profile. The slopes $S_x$ and $S_y$ were calculated using a slope bin size of 0.5 degrees. As is evident from FIG. 23, sample A had a symmetric slope distribution along both the x- and the y-directions. Sample A had a broader slope distribution along the x-direction and a narrower slope distribution along the y-direction. FIG. 24 shows the percent height distribution across the analyzed surface for sample A. As is evident from FIG. 24, the sample had a substantially symmetric height distribution relative to the peak height of the sample which was about 4.7 microns. FIG. 25 shows the percent slope magnitude for sample A, where the slope magnitude $S_m$ was calculated from the following expression:

$$S_m = \sqrt{[\partial H/\partial x]^2 + [\partial H/\partial y]^2} \quad (3)$$

Figure 26:
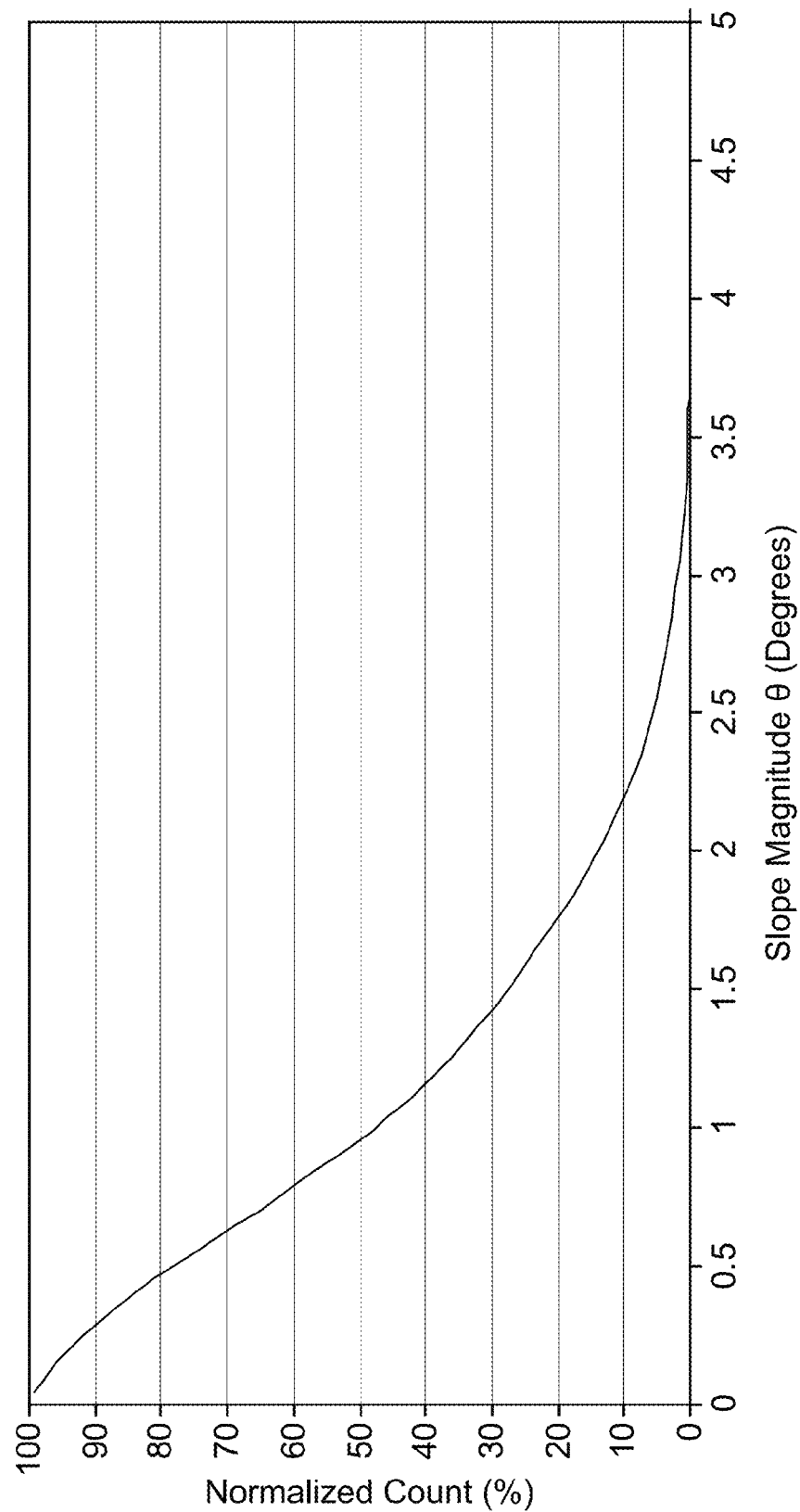
FIG. 26 is percent cumulative slope distribution for the microstructured surface in FIG. 21.

FIG. 26 shows the percent cumulative slope distribution $S_c(\theta)$ for sample A, where $S_c(\theta)$ was calculated from the following expression:

$$S_c(\theta) = \frac{\int_\theta^\infty S_m}{\int_0^\infty S_m} \quad (4)$$

As is evident from FIG. 26, about 100% of the surface of sample A had a slope magnitude less than about 3.5 degrees. Furthermore, about 52% of the analyzed surface had slope magnitudes less than about 1 degree, and about 72% of the analyzed surface had slope magnitudes less than about 1.5 degrees.

Three additional samples similar to sample A, and labeled B, C, and D, were characterized as previously outlined. All four samples A-D had microstructures similar to microstructures 160 and were made using a cutting tool system similar to cutting tool system 1000 to make a patterned roll using a cutter similar to cutter 1120 and subsequently microreplicating the patterned tool to make matte layers similar to matter layer 140. Sample B had an optical transmittance of about 95.2%, an optical haze of about 3.28% and an optical clarity of about 78%; Sample C had an optical transmittance of about 94.9%, an optical haze of about 2.12%, and an optical clarity of about 86.1%; and sample D had an optical transmittance of about 94.6%, an optical haze of about 1.71%, and an optical clarity of about 84.8%. In addition, six comparative samples, labeled R1-R6, were characterized. Samples R1-R3 were similar to matte layer 860 and included a plurality of large beads dispersed in a binder, where the matte surfaces were primarily formed because of the beads. Sample R1 had an optical haze of about 17.8% and an optical clarity of about 48.5%, sample R2 (available from Dai Nippon Printing Co., Ltd.) had an optical haze of about 32.2% and an optical clarity of about 67.2%, and sample R3 had an optical haze of about 4.7% and an optical clarity of about 73.3%. Sample R4 was an embossed polycarbonate film (available from Keiwa Inc., Osaka, Japan) and had an optical haze of about 23.2% and an optical clarity of about 39.5%.

Figure 27:
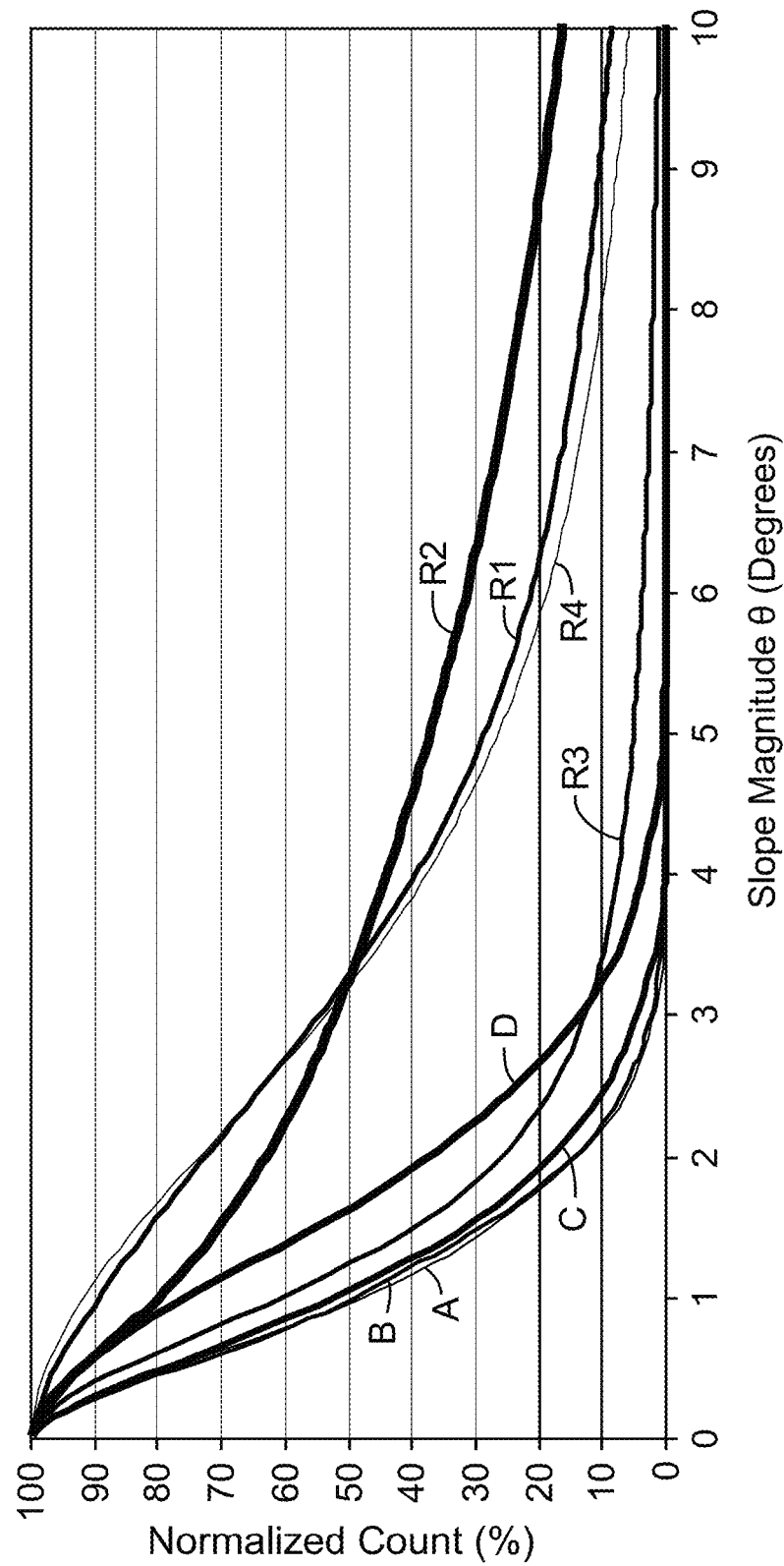
FIG. 27 is percent cumulative slope distributions for various microstructured surfaces.

FIG. 27 is the percent cumulative slope distribution $S_c(\theta)$ for samples A-D and R1-R4. Each of samples A-D was similar to matte layer 140 and included a structured major surface similar to structured major surface 120. As evident from FIG. 27, no more than about 7%, or about 6.5%, or about 6%, or about 5.5%, or about 5%, or about 4.5%, or about 4%, or about 3.5%, or about 3%, of the structured major surfaces of all, or at least some, of the samples A-D had a slope magnitude greater than about 3.5 degrees. Furthermore, no more than about 4%, or about 3.5%, or about 3%, or about 2.5%, or about 2%, or about 1.5%, or about 1%, or about 0.9%, or about 0.8%, of the structured major surfaces of all, or at least some, of the samples A-D had a cumulative slope magnitude greater than about 5 degrees.

Referring back to FIG. 1, when used in an optical system such as in a liquid crystal display, light redirecting film 100 is capable of hiding or masking optical and/or physical defects of the display and enhancing the brightness of the display. In some cases, the average effective transmission of light redirecting film 100 is less by no more than about 2%, or by no more than about 1.5%, or by no more than about 1%, or by no more than about 0.75%, or by no more than about 0.5%, as compared to a light redirecting film that has the same construction as light redirecting film 100, except for having a smooth second major surface 120. In some cases, the average effective transmission of the light redirecting film is greater than by no less than about 0.2%, or about 0.3%, or about 0.4%, or about 0.5%, or about 1%, or about 1.5%, or about 2%, ac compared to a light redirecting film that has the same construction, except for having a smooth second major surface. As an example, a light redirecting film was fabricated that was similar to light redirecting film 100. Linear prisms 150 had a pitch of about 24 microns, an apex angle 152 of about 90 degrees, and index of refraction of about 1.65. Second major surface 120 had an optical haze of about 1.5% and an optical clarity of about 83%. The light redirecting film had an average effective transmission of about 1.803. For comparison, a similar light redirecting film that had the same construction (including material composition) except for comprising a smooth second major surface, had an average effective transmission of about 1.813.

As another example, a light redirecting film was fabricated that was similar to light redirecting film 100. Microstructures 160 were made by replication from a tool that was cut with a cutter similar to cutter 1110 where the radius of cutter tip 1115 was about 3300 microns. Linear prisms 150 had a pitch of about 24 microns, an apex angle 152 of about 90 degrees, and index of refraction of about 1.567. Second major surface 120 had an optical haze of about 1.71% and an optical clarity of about 84.8%. The light redirecting film had an average effective transmission of about 1.633. For comparison, a similar light redirecting film that had the same construction (including material composition) except for comprising a smooth second major surface, had an average effective transmission of about 1.626. Hence, the structured second major surface 120 provided additional gain by increasing the average effective transmission by about 0.43%.

As another example, a light redirecting film was fabricated that was similar to light redirecting film 100. Microstructures 160 were made by replication from a tool that was cut with a cutter similar to cutter 1110 where the radius of cutter tip 1115 was about 4400 microns. Linear prisms 150 had a pitch of about 24 microns, an apex angle 152 of about 90 degrees, and index of refraction of about 1.567. Second major surface 120 had an optical haze of about 1.49% and an optical clarity of about 82.7%. The light redirecting film had an average effective transmission of about 1.583. For comparison, a similar light redirecting film that had the same construction (including material composition) except for comprising a smooth second major surface, had an average effective transmission of about 1.578. Hence, the structured second major surface 120 provided additional gain by increasing the average effective transmission by about 0.32%.

As yet another example, a light redirecting film was fabricated that was similar to light redirecting film 100. Microstructures 160 were made by replication from a tool that was cut with a cutter similar to cutter 1110 where the radius of cutter tip 1115 was about 3300 microns. Linear prisms 150 had a pitch of about 24 microns, an apex angle 152 of about 90 degrees, and index of refraction of about 1.567. Second major surface 120 had an optical haze of about 1.35% and an optical clarity of about 85.7%. The light redirecting film had an average effective transmission of about 1.631. For comparison, a similar light redirecting film that had the same construction (including material composition) except for comprising a smooth second major surface, had an average effective transmission of about 1.593. Hence, the structured second major surface 120 provided additional gain by increasing the average effective transmission by about 2.38%.

Substrate layer 170 can be or include any material that may be suitable in an application, such as a dielectric, a semiconductor, or a metal. For example, substrate layer 170 can include or be made of glass and polymers such as polyethylene terephthalate (PET), polycarbonates, and acrylics. Substrate 170 can be rigid or flexible. Substrate 170 can have any thickness and/or index of refraction that may be desirable in an application. For example, in some cases, substrate layer 170 can be PET and have a thickness of about 50 microns or about 175 microns.

Figure 28:
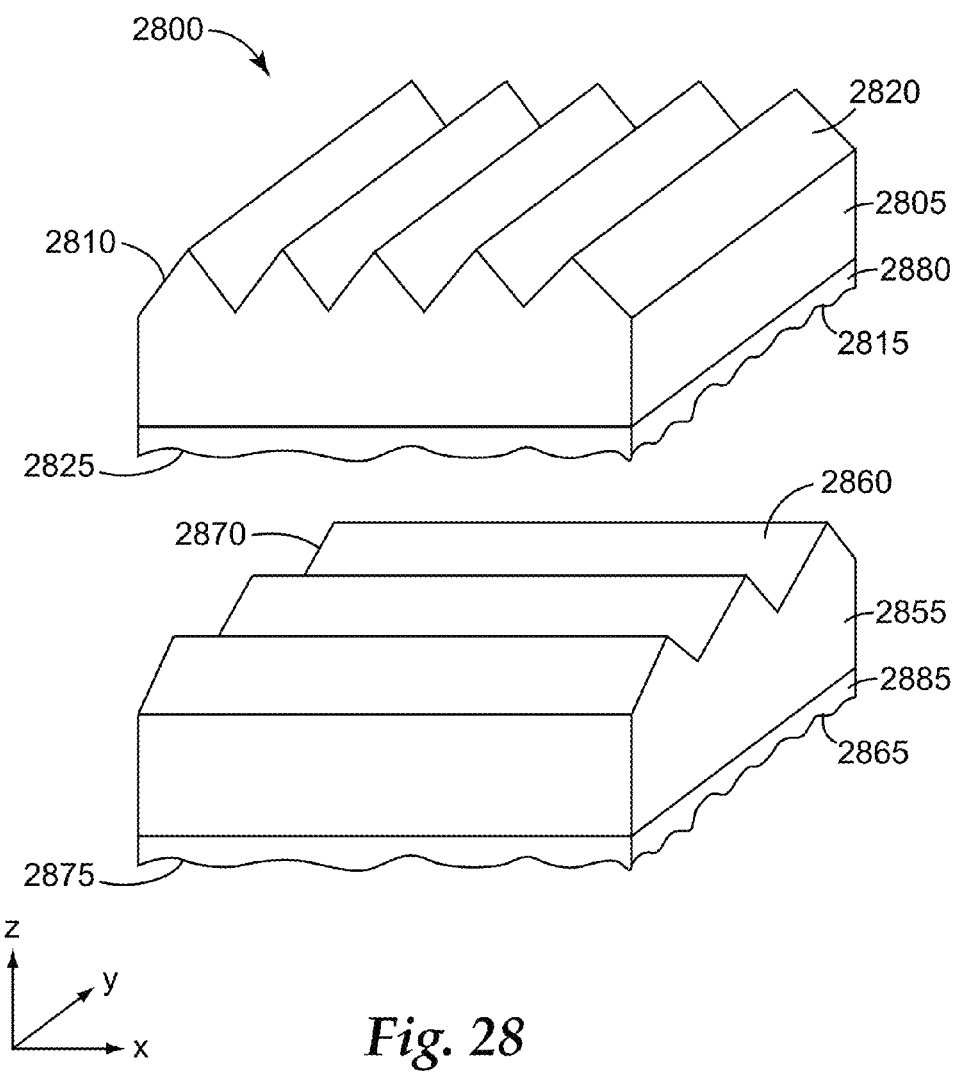
FIG. 28 is a schematic side-view of an optical stack.

FIG. 28 is a schematic side-view of an optical stack 2800 that includes a first light redirecting film 2805 disposed on a second light redirecting film 2855. One or both of the light redirecting films can be similar to light redirecting film 100. First light redirecting film 2805 includes a first major surface 2810 and an opposing second major surface 2815. The first major surface includes a first plurality of microstructures 2820 that extend along the y-direction, and the second major surface includes a second plurality of microstructures 2825. Second light redirecting film 2855 includes a third major surface 2860 and an opposing fourth major surface 2865. Third major surface 2860 faces second major surface 2815 of the first light redirecting film and includes a third plurality of microstructures 2870 that extend along a different direction than the y-direction, such as the x-direction. Fourth major surface 2865 includes a fourth plurality of microstructures 2875.

In some cases, first light redirecting film 2805 includes a matte layer 2880 that includes second major surface 2815. Similarly, in some cases, second light redirecting film 2855 includes a matte layer 2885 that includes fourth major surface 2865.

In some cases, such as when optical stack 2800 is included in the backlight of a liquid crystal display, linear microstructures 2820 and/or 2870 can give rise to moiré. In some cases, the two light redirecting films, and in particular, the top light redirecting film, can give rise to color mura. Color mura is due to the index dispersion of the light redirecting films. The first order color mura is typically visible close to the viewing angle limit of the light redirecting film while higher order color mura are typically visible at higher angles. In some cases, such as when major surfaces 2815 and 2865 have sufficiently low optical haze and clarity, the optical stack can effectively mask or eliminate moiré and color mura without significantly reducing the display brightness. In such cases, each of the second and fourth major surfaces has an optical haze that is not greater than about 5%, or not greater than about 4.5%, or not greater than about 4%, or not greater than about 3.5%, or not greater than about 3%, or not greater than about 2.5%, or not greater than about 2%, or not greater than about 1.5%, or not greater than about 1%; and each of the second and fourth major surfaces has an optical clarity that is not greater than about 85%, or not greater than about 80%, or not greater than about 75%, or not greater than about 70%, or not greater than about 65%, or not greater than about 60%.

In some cases, such as when optical stack 2800 is used in a display system to increase the brightness, the average effective transmission (ETA) of the optical stack is not less than about 2.4, or not less than about 2.45, or not less than about 2.5, or not less than about 2.55, or not less than about 2.6, or not less than about 2.65, or not less than about 2.7, or not less than about 2.75, or not less than about 2.8. In some cases, the average effective transmission of optical stack 2800 is less by no more than about 1%, or about 0.75%, or about 0.5%, or about 0.25%, or about 0.1%, as compared to an optical stack that has the same construction (including material composition) except for comprising smooth second and fourth major surfaces. In some cases, the average effective transmission of optical stack 2800 is not less as compared to an optical stack that has the same construction except for having smooth second and fourth major surfaces. In some cases, the average effective transmission of optical stack 2800 is greater by at least about 0.1%, or about 0.2%, or about 0.3%, as compared to an optical stack that has the same construction except for comprising smooth second and fourth major surfaces. As an example, an optical stack was fabricated that was similar to optical stack 2800 and had an average effective transmission of about 2.773. Each of respective second and fourth major surfaces 2815 and 2865 had an optical haze of about 1.5% and an optical clarity of about 83%. The linear prisms had an index of refraction of about 1.65. For comparison, a similar optical stack that had the same construction except for including smooth second and fourth major surfaces, had an average effective transmission of about 2.763. Hence, the structured bottom major surfaces 2815 and 2865 provided additional again by increasing the average effective transmission by about 0.36%.

As another example, an optical stack was fabricated that was similar to optical stack 2800 and had an average effective transmission of about 2.556. Each of respective second and fourth major surfaces 2815 and 2865 had an optical haze of about 1.29% and an optical clarity of about 86.4%. The linear prisms had a pitch of about 24 microns, an apex angle of about 90 degrees, and an index of refraction of about 1.567. For comparison, a similar optical stack that had the same construction except for including smooth second and fourth major surfaces, had an average effective transmission of about 2.552. Hence, the structured bottom major surfaces 2815 and 2865 provided additional again by increasing the average effective transmission by about 0.16%.

As yet another example, an optical stack was fabricated that was similar to optical stack 2800 and had an average effective transmission of about 2.415. Each of respective second and fourth major surfaces 2815 and 2865 had an optical haze of about 1.32% and an optical clarity of about 84.8%. The linear prisms had a pitch of about 24 microns, an apex angle of about 90 degrees, and an index of refraction of about 1.567. For comparison, a similar optical stack that had the same construction except for including smooth second and fourth major surfaces, had an average effective transmission of about 2.404. Hence, the structured bottom major surfaces 2815 and 2865 provided additional again by increasing the average effective transmission by about 0.46%.

Figure 29:
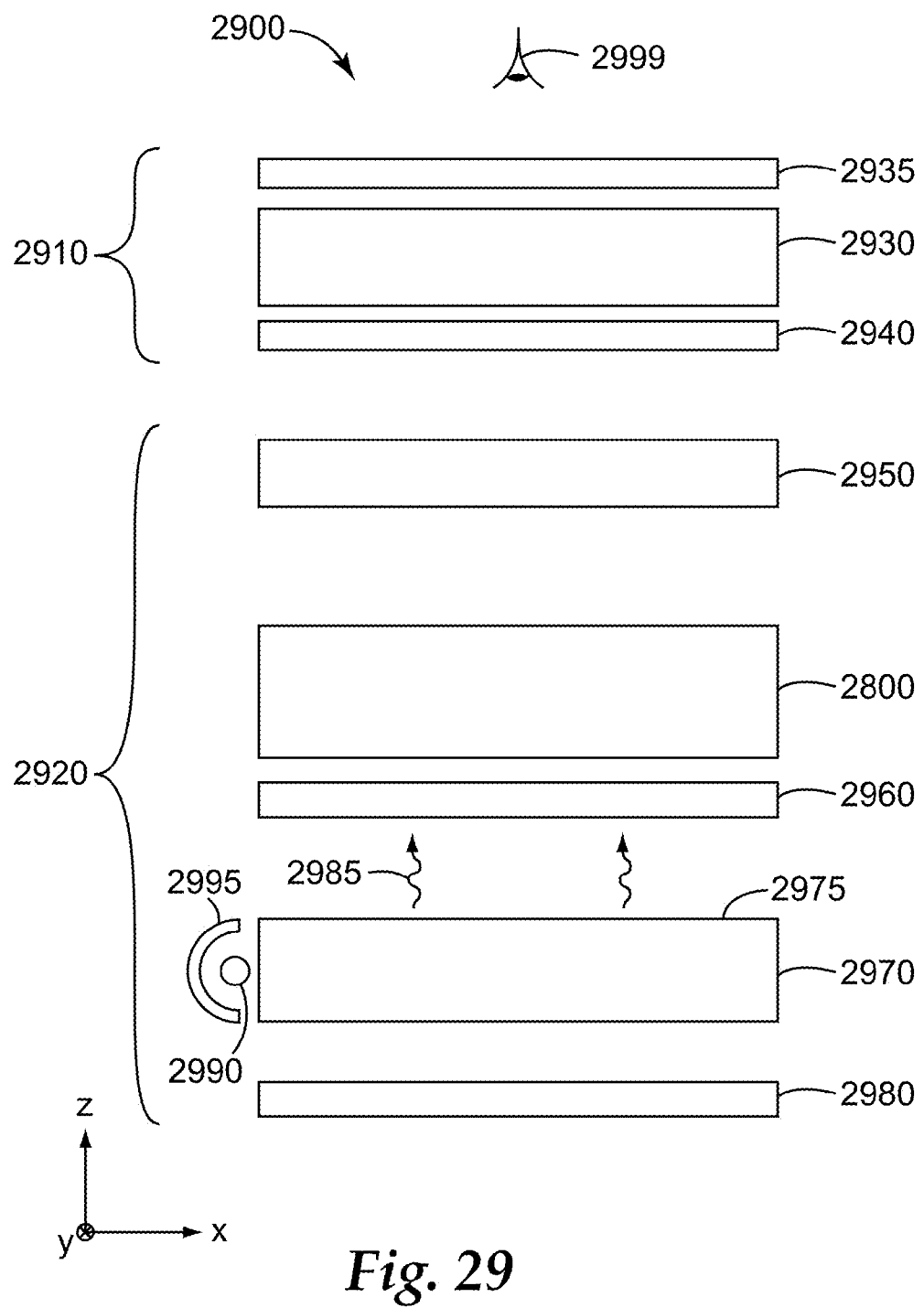
FIG. 29 is a schematic side-view of a display system.

FIG. 29 is a schematic side-view of a display system 2900 for displaying information to a viewer 2999. The display system includes a liquid crystal panel 2910 that is disposed on and is illuminated by a backlight 2920. Liquid crystal panel 2910 includes a liquid crystal cell 2930 that is disposed between linear light absorbing polarizers 2935 and 2940. In some cases, such as when display system 2900 displays an image to viewer 2999, liquid crystal panel 2910 can be pixilated.

Backlight 2920 includes a lightguide 2970 that receives light through an edge of the lightguide from a lamp 2990 that is housed in a side reflector 2995, a back reflector 2980 for reflecting light that is incident on the back reflector toward viewer 2999, an optical diffuser 2960 for homogenizing light 2985 that exits from an emitting surface 2975 of the lightguide, and optical stack 2800 from FIG. 28 disposed between the optical diffuser and a reflective polarizer 2950.

Optical stack 2800 includes light redirecting films 2805 and 2855. In some cases, linear prisms of the two light redirecting films are orthogonally oriented relative to each other. For example, linear prisms 2820 can extend along the y-direction and linear prisms 2870 can be oriented along the x-direction. Microstructures 2825 and 2875 face lightguide 2970 and prismatic microstructures 2820 and 2870 face away from the lightguide.

Optical stack 2800 enhances the brightness, such as the on-axis brightness, of the display system. At the same time, respective second and fourth major surfaces 2815 and 2865 of the optical stack have sufficiently low optical clarities to mask physical defects such as scratches, and hide and/or eliminate optical defects such moiré and color mora.

Reflective polarizer 2950 substantially reflects light that has a first polarization state and substantially transmits light that has a second polarization state, where the two polarization states are mutually orthogonal. For example, the average reflectance of reflective polarizer 2950 in the visible for the polarization state that is substantially reflected by the reflective polarizer is at least about 50%, or at least about 60%, or at least about 70%, or at least about 80%, or at least about 90%, or at least about 95%. As another example, the average transmittance of reflective polarizer 2950 in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 2950 substantially reflects light having a first linear polarization state (for example, along the x-direction) and substantially transmits light having a second linear polarization state (for example, along the y-direction).

Any suitable type of reflective polarizer may be used for reflective polarizer layer 2950 such as, for example, a multilayer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, reflective polarizer 2950 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer 2950 and an incident light in the unmatched polarization state is substantially reflected by reflective polarizer 2950. In some cases, an MOF reflective polarizer 2950 can include a stack of inorganic dielectric layers.

As another example, reflective polarizer 2950 can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, reflective polarizer 2950 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, reflective polarizer 2950 can be a multilayer optical film that reflects or transmits light by optical interference, such as those described in Provisional U.S. Patent Application No. 61/116,132, filed Nov. 19, 2009; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; Provisional U.S. Patent Application No. 61/116,295, filed Nov. 19, 2008; and International Patent Application No. PCT/US 2008/060311, filed May 19, 2008, claiming priority from Provisional U.S. Patent Application No. 60/939,085, filed Apr. 15, 200; all incorporated herein by reference in their entirety.

Optical diffuser 2960 has the primary functions of hiding or masking lamp 2990 and homogenizing light 2985 that is emitted by lightguide 2970. Optical diffuser 2960 has a high optical haze and/or a high diffuse optical reflectance. For example, in some cases, the optical haze of the optical diffuser is not less than about 40%, or not less than about 50%, or not less than about 60%, or not less than about 70%, or not less than about 80%, or not less than about 85%, or not less than about 90%, or not less than about 95%. As another example, the diffuse optical reflectance of the optical diffuser is not less than about 30%, or not less than about 40%, or not less than about 50%, or not less than about 60%.

Optical diffuser 2960 can be or include any optical diffuser that may be desirable and/or available in an application. For example, optical diffuser 2960 can be or include a surface diffuser, a volume diffuser, or a combination thereof. For example, optical diffuser 2960 can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

Back reflector 2980 receives light that is emitted by the lightguide away from viewer 2999 along the negative z-direction and reflects the received light towards the viewer. Display systems such as display system 2900 where lamp 2990 is placed along an edge of a lightguide, are generally referred to as edge-lit or backlit displays or optical systems. In some cases, the back reflector can be partially reflective and partially transmissive. In some cases, the back reflector can be structured, for example, have a structured surface.

Back reflector 2980 can be any type reflector that may be desirable and/or practical in an application. For example, the back reflector can be a specular reflector, a semi-specular or semi-diffuse reflector, or a diffuse reflector, such as those disclosed in International Patent Application No. PCT/US 2008/064115, filed May 19, 2008, claiming priority from Provisional U.S. Patent Application No. 60/939,085, filed May 20, 2007, both incorporated herein by reference in their entirety. For example, the reflector can be an aluminized film or a multi-layer polymeric reflective film, such as an enhanced specular reflector (ESR) film (available from 3M Company, St. Paul, Minn.). As another example, back reflector 2980 can be a diffuse reflector having a white appearance.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 1 is flipped as compared to the orientation in the figure, first major surface 110 is still considered to be the top major surface.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An optical film comprising a structured major surface comprising geometrical symmetry and asymmetric slope distribution, wherein no more than about 7% of the structured major surface has a slope magnitude greater than about 3.5 degrees or no more than about 4% of the structured major surface has a slope magnitude greater than about 5 degrees.

2. An optical film comprising a structured major surface comprising geometrical symmetry and asymmetric slope distribution, the optical film having an optical haze that is not greater than about 3% and an optical clarity that is not greater than about 85%.

3. An optical film comprising a structured major surface comprising geometrical asymmetry and symmetric slope distribution, wherein no more than about 7% of the structured major surface has a slope magnitude greater than about 3.5 degrees or no more than about 4% of the structured major surface has a slope magnitude greater than about 5 degrees.

4. An optical film comprising a structured major surface comprising geometrical asymmetry and symmetric slope distribution, the optical film having an optical haze that is not greater than about 3% and an optical clarity that is not greater than about 85%.

* * * * *